(12) United States Patent
Abe

(10) Patent No.: US 6,343,190 B1
(45) Date of Patent: Jan. 29, 2002

(54) WHITE BALANCE ADJUSTING DEVICE

(75) Inventor: Tetsuya Abe, Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/589,061

(22) Filed: Jun. 8, 2000

Related U.S. Application Data

(62) Division of application No. 08/762,943, filed on Dec. 10, 1996, now Pat. No. 6,094,539.

(30) Foreign Application Priority Data

Jan. 24, 1996 (JP) ............................................ P08-29939
Jan. 25, 1996 (JP) ............................................ P08-31314

(51) Int. Cl.⁷ .......................... G03B 7/00; G03B 17/50; G03B 19/00
(52) U.S. Cl. ......................... 396/225; 396/30; 396/429
(58) Field of Search ........................ 396/30, 225, 231, 396/307, 308, 311, 315, 319, 429, 430, 317; 348/231–233; 430/42–44, 495.1, 496

(56) References Cited

U.S. PATENT DOCUMENTS

| | | | | |
|---|---|---|---|---|
| 4,230,408 A | 10/1980 | Nigg | ............................ | 355/35 |
| 4,841,322 A | 6/1989 | Kawasaki et al. | ............ | 396/93 |
| 4,945,376 A | 7/1990 | Kawasaki et al. | ............ | 396/93 |
| 5,161,233 A | 11/1992 | Matsuo et al. | .............. | 399/136 |
| 5,251,021 A | 10/1993 | Parulski et al | .............. | 358/500 |
| 5,283,632 A | 2/1994 | Suzuki et al. | ................ | 348/223 |
| 5,315,410 A | 5/1994 | Takanashi et al. | .......... | 358/471 |
| 5,408,341 A | 4/1995 | Takanashi et al. | .......... | 358/471 |
| 5,424,156 A | 6/1995 | Aoki et al. | ................. | 430/58.4 |
| 5,424,798 A * | 6/1995 | Takagi | ......................... | 354/413 |
| 5,550,587 A * | 8/1996 | Miyadera | .................... | 348/223 |
| 5,583,397 A * | 12/1996 | Ogawa | ........................ | 315/151 |
| 5,631,700 A | 5/1997 | Sato | ............................. | 348/222 |
| 5,646,927 A | 7/1997 | Shimizu et al. | ................ | 369/99 |
| 5,655,170 A | 8/1997 | Yamamoto et al. | ......... | 396/429 |
| 5,708,472 A | 1/1998 | Morisawa et al. | .......... | 348/373 |
| 5,739,849 A | 4/1998 | Aoki et al. | ................. | 348/207 |
| 5,778,270 A | 7/1998 | Morisawa | .................... | 396/429 |
| 5,805,945 A | 9/1998 | Aoki | ........................... | 396/429 |
| 5,808,675 A | 9/1998 | Yamamoto | .................. | 348/294 |

(List continued on next page.)

FOREIGN PATENT DOCUMENTS

| | | |
|---|---|---|
| EP | 0327236 | 8/1989 |
| EP | 0622954 | 11/1994 |
| JP | 2-29081 | 1/1990 |
| JP | 3-15087 | 1/1991 |
| JP | 3-278342 | 12/1991 |
| JP | 5-2280 | 1/1993 |
| JP | 5-24706 | 4/1993 |
| JP | 5-150251 | 6/1993 |
| JP | 5-165005 | 6/1993 |
| JP | 6-130347 | 5/1994 |
| JP | 6-313894 | 11/1994 |
| JP | 7-13132 | 1/1995 |

*Primary Examiner*—Christopher E. Mahoney
(74) *Attorney, Agent, or Firm*—Greenblum & Bernstein, P.L.C.

(57) ABSTRACT

A white balance adjusting device mounted in an electro-developing type camera in which an electro-developing recording medium, which electronically develops an image formed thereon, is used. A mask member, in which first and second color filters are provided, is disposed in front of an electro-developing recording medium. The electro-developing recording medium has a recording area, in which a color image is recorded, and a data area, in which optical information used for a white balance adjustment is recorded. The first color filter faces the recording area, and the second color filter faces the data area. In the camera body, a diffuser and a light leading member are provided at a position corresponding to the second color filter.

11 Claims, 23 Drawing Sheets

U.S. PATENT DOCUMENTS

| | | | | |
|---|---|---|---|---|
| 5,842,050 A | | 11/1998 | Aoki | 396/300 |
| 5,857,125 A | | 1/1999 | Morisawa | 396/429 |
| 5,883,474 A | * | 3/1999 | Kim | 315/241 |
| 5,884,109 A | | 3/1999 | Sato et al. | 396/429 |
| 5,895,127 A | | 4/1999 | Yamamoto | 396/30 |
| 5,905,526 A | | 5/1999 | Sato | 348/96 |
| 5,930,542 A | | 7/1999 | Yamamoto et al. | 396/429 |
| 5,940,647 A | | 8/1999 | Abe | 396/429 |
| 5,940,648 A | | 8/1999 | Sato | 396/429 |
| 5,978,609 A | | 11/1999 | Aoki | 396/429 |
| 5,978,611 A | | 11/1999 | Yamamoto et al. | 396/429 |
| 5,983,038 A | * | 11/1999 | Sato et al | 396/429 |
| 6,088,532 A | | 7/2000 | Yamamoto et al. | 396/30 |

* cited by examiner

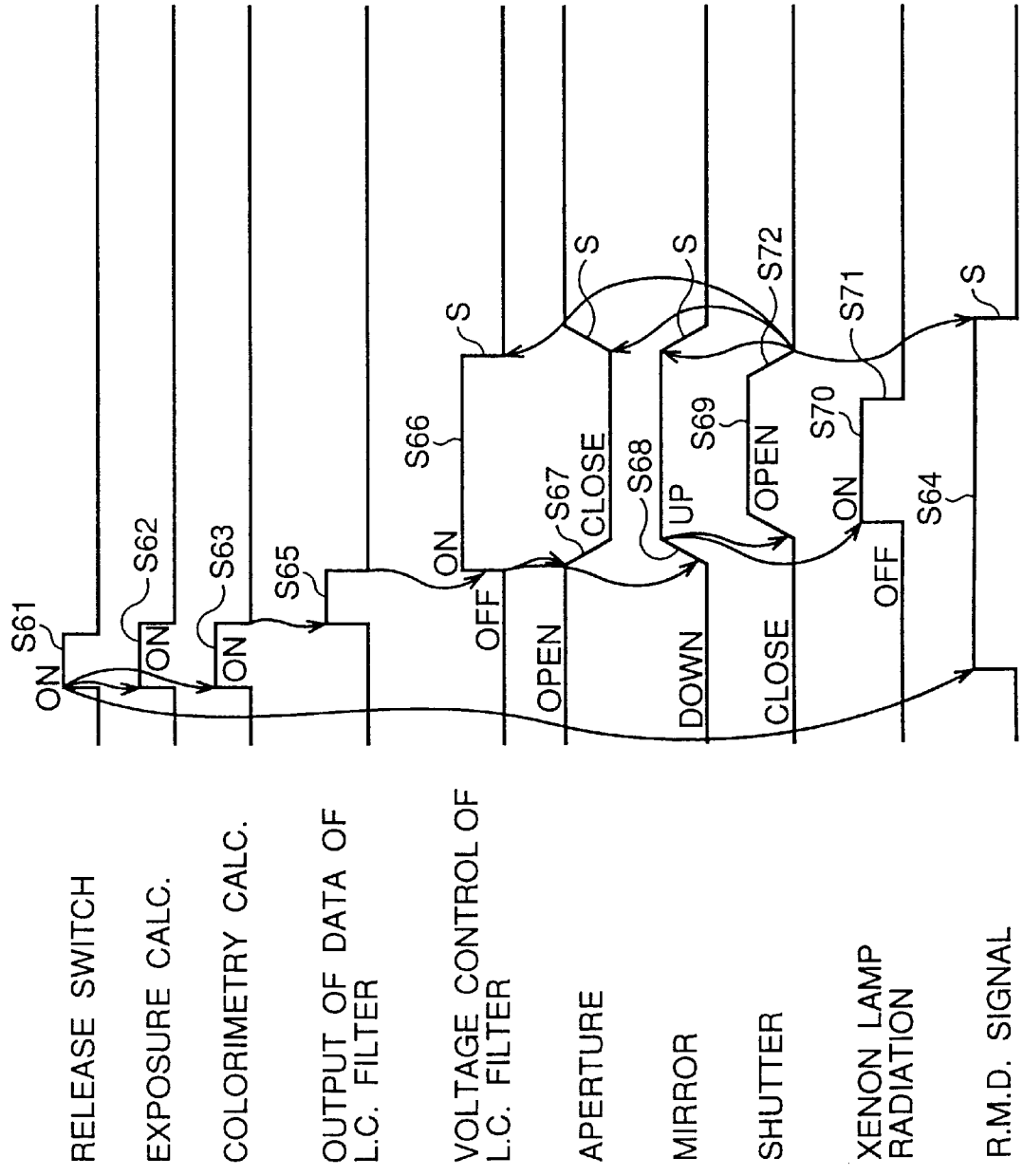

WHITE BALANCE ADJUSTING DEVICE

This application is a division of U.S. patent application Ser. No. 08/762,943, filed Dec. 10, 1996, now U.S. Pat. No. 6,094,539 the contents of which are expressly incorporated by reference in its entirety.

BACKGROUND OF THE INVENTION

1. Field of the Invention

The present invention relates to a camera using a recording medium in which an object image obtained through a photographing optical system is electronically developed, and more particularly, to a device for performing a white balance adjustment when the image recorded in the recording medium is read therefrom, or when the image is developed by the recording medium.

2. Description of the Related Art

Conventionally, as disclosed in Japanese Unexamined Patent Publication No. 5-2280 and U.S. Pat. No. 5,424,156, there is known a photographic material which is directly electronically developed so that the developed visible image can be immediately obtained. In this specification, such a recording medium is referred to as an electro-developing recording material, and an electronic still camera using the electro-developing recording material is referred to as an electro-developing type camera.

As a type of the electro-developing type camera which can take a color image, a construction, in which a single color image is obtained by a single shutter release operation, can be designed. In this construction, a color filter having red, green, and blue filter elements is disposed in front of the electro-developing recording medium.

However, the illuminance of light radiated on the electro-developing recording medium through each of the filter elements is not necessarily the same due to the characteristics of the color filter, or the characteristics of the illumination light radiated onto the object to be photographed. Therefore, it is necessary, for example, when reading the image from the electro-developing recording medium, to perform a white balance adjustment. Accordingly, the electro-developing type camera should be provided with a white balance sensor which detects the amount of energy of light of each of the color components, and a white balance signal processing circuit which converts the output signal of the white balance sensor to color temperature information, and carries out the white balance adjustment based on the color temperature information. Thus, the electric circuit construction in the electro-developing type camera should have a complex structure owing to the provision of a various kinds of circuits.

SUMMARY OF THE INVENTION

Therefore, an object of the present invention is to provide a white balance adjusting device by which an image having proper or natural colors is obtained, and to provide an electro-developing recording medium, which is suitable for the white balance adjusting device.

According to the present invention, there is provided an electro-developing recording medium by which a color image formed thereon is electronically developed, the electro-developing recording medium comprising a recording area for recording the color image, and a data area for recording optical information corresponding to the amount of exposure of each of the predetermined color components included in the color image, the data area being provided outside of the recording area.

Further, according to the present invention, there is provided a white balance adjusting device provided in an electro-developing type camera using an electro-developing recording medium by which a color image formed thereon is electronically developed, the electro-developing recording medium having a recording area for recording the color image, and a data area for recording optical information corresponding to the amount of exposure of each of the predetermined color components included in the color image, the data area being provided outside of the recording area, the white balance adjusting device comprising a first color filter, a second color filter, and a diffuser.

The first color filter is provided at a first position corresponding to the recording area, and has color filter elements of the predetermined color components. The second color filter is provided at a second position corresponding to the data area, and has color filter elements of the predetermined color components. The diffuser is provided at a position corresponding to the second color filter so that the illuminance of light led to the data area becomes uniform over the data area.

Furthermore, according to the present invention, there is provided a white balance adjusting device provided in an electro-developing type camera using an electro-developing recording medium by which a color image formed thereon is electronically developed, the white balance adjusting device comprising a first radiating processor, a second radiating processor, a colorimetry sensor, and a light amount control processor.

The first radiating processor radiates a light having a first color temperature onto the electro-developing recording medium. The second radiating processor radiates a light having a second color temperature, which is different from the first color temperature, onto the electro-developing recording medium. The colorimetry sensor senses a color temperature of ambient light around an object which is to be photographed by the electro-developing type camera. The light amount control processor controls the amount of light radiated by the first and second radiating processors, in accordance with the color temperature detected by the colorimetry sensor, so that a white balance adjustment for the color image developed by the electro-developing recording medium is performed.

BRIEF DESCRIPTION OF THE DRAWINGS

The objects and advantages of the present invention will be better understood from the following description, with reference to the accompanying drawings in which:

FIG. 19 is a timing chart showing a photographing operation of the second embodiment;

DESCRIPTION OF THE PREFERRED EMBODIMENTS

Figure 1:
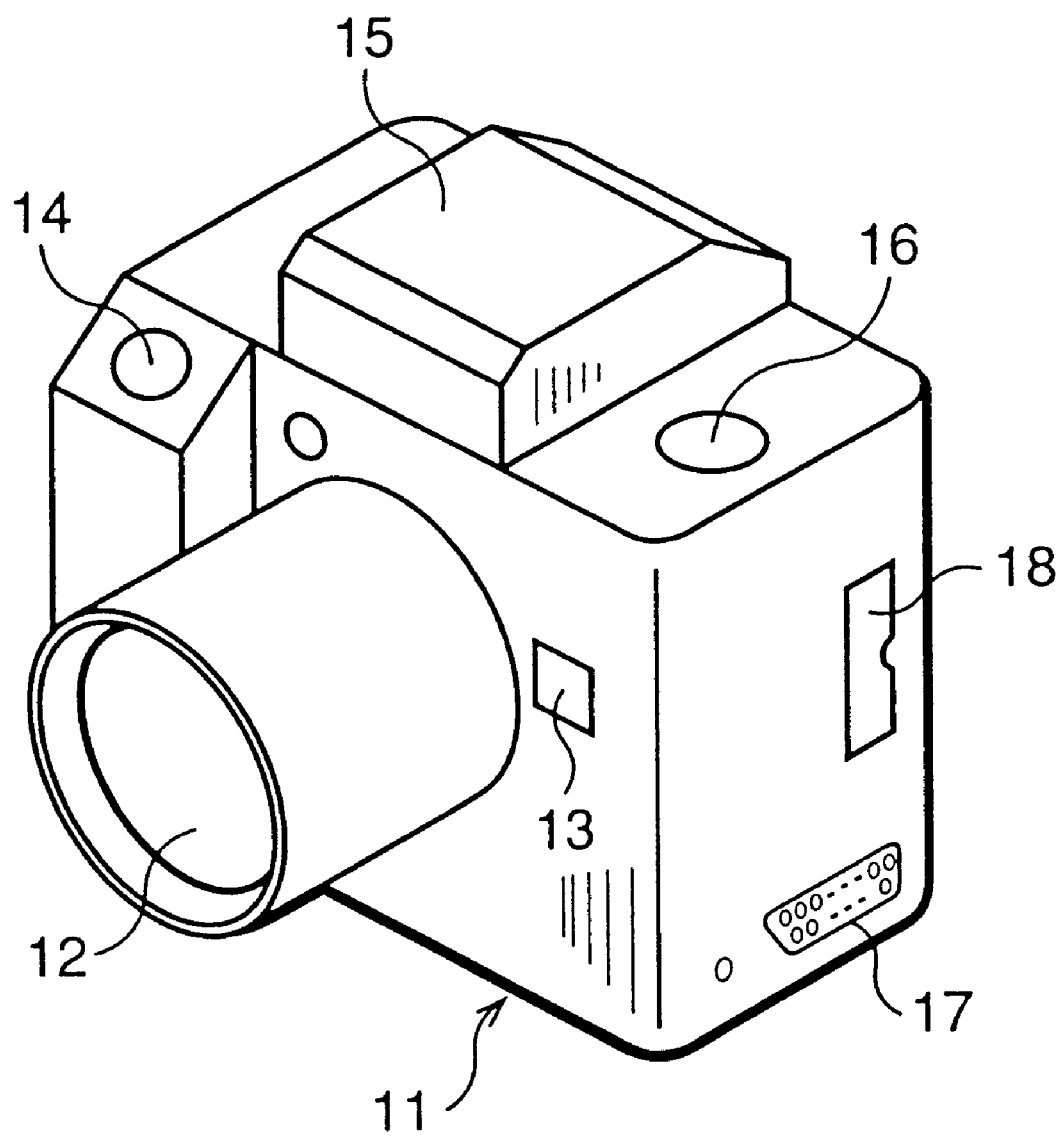
FIG. 1 is an external view showing an electro-developing type camera to which a first embodiment of the present invention is applied.

FIG. 1 is an external view of an electro-developing type camera to which a first embodiment according to the present invention is applied.

When viewing a camera body 11 from the front side, a photographing optical system 12 including a photographing lens system and so on is provided approximately at a center portion of the front surface of the camera body 11, and a white diffuser 13 is disposed thereon to the right of and above the photographing optical system 12. A release switch 14 is provided on the side opposite to the white diffuser 13.

A view finder 15 is provided at a center portion of the upper surface of the camera body 11. A scan start switch 16 is provided beside the view finder 15. An output terminal 17 is formed on a lower portion of a side surface of the camera body 11, so that an image signal obtained by this camera can be outputted to an external recording device. A slot (not shown), which is usually closed by a cover 18, is formed in the side surface of the camera body 11 so that an electro-developing recording medium can be inserted into the camera body 11.

Figure 2:
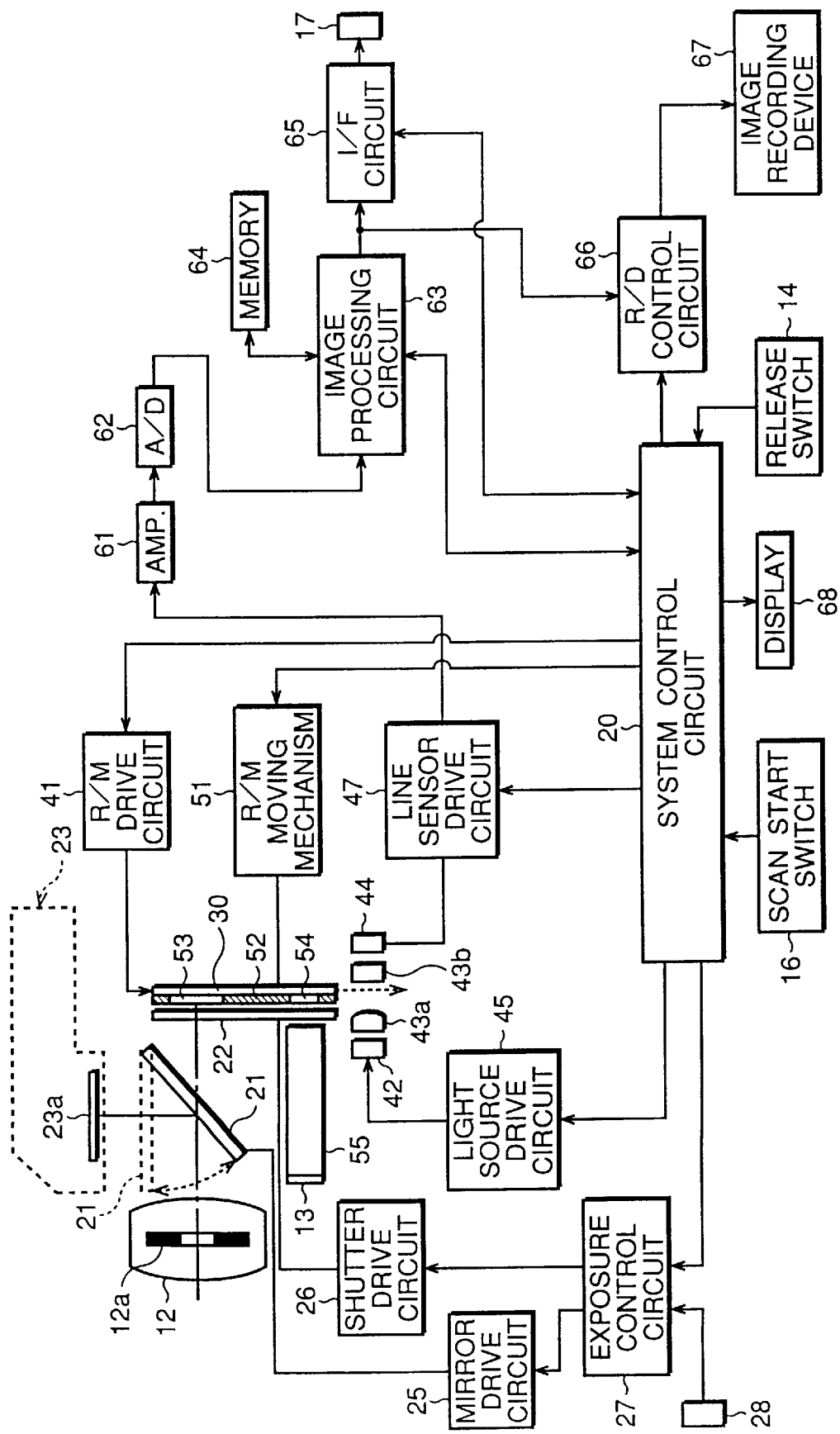
FIG. 2 is a block diagram of the electro-developing type camera of the first embodiment.

FIG. 2 is a block diagram of the electro-developing type camera, in which a system control circuit 20 including a microcomputer is mounted to control the electro-developing type camera as a whole.

The photographing optical system 12 has a plurality of lens groups and an aperture 12a. An electro-developing recording medium 30 is disposed behind the photographing optical system 12, and a mask member 52, in which first and second color filters 53 and 54 are fitted, is disposed in front of the electro-developing recording medium 30. A quick return mirror 21 is placed between the photographing optical system 12 and the electro-developing recording medium 30. A shutter 22 is provided between the quick return mirror 21 and the electro-developing recording medium 30. Namely, the shutter 22 faces the first and second color filters 53 and 54. A focusing glass 23a included in a view finder optical system 23 is disposed above the quick return mirror 21.

The quick return mirror 21 and the shutter 22 are driven by a mirror drive circuit 25 and a shutter drive circuit 26, respectively, which are controlled by an exposure control circuit 27. A photometry sensor 28, which performs a photometry measurement, is connected to the exposure control circuit 27. The exposure control circuit 27 is operated in accordance with a command signal outputted by the system control circuit 20.

The quick return mirror 21 is usually set to a down position (an inclining position shown by the solid line in the drawing), so that a light beam passing through the photographing optical system 12 is directed to the view-finder optical system 23 to form an object image on the focusing glass 23a, and thus an object to be photographed can be observed by the photographer through the finder optical system (not shown). When a photographing operation is carried out, the quick return mirror 21 is rotated upwards by the mirror drive circuit 25 and set to an up position (a horizontal position shown by the broken line in the drawing), so that the light beam is directed to the electro-developing recording medium 30.

The shutter 22 is usually closed, but during a photographing operation, the shutter 22 is opened for a predetermined period by the shutter drive circuit 26 under the control of the exposure control circuit 27, and thus, the light beam passing through the photographing optical system 12 enters a light receiving surface of the electro-developing recording medium 30, to thereby form a two-dimensional image thereon.

The aperture 12a is a fixed aperture, that is, an opening having a predetermined diameter. This aperture diameter has been adjusted or made in such a manner that an illuminance of light, which is irradiated onto a recording area 30a (see FIG. 4) of the electro-developing recording medium 30, through the photographing lens and from a light source of predetermined illuminance, is in accordance with an illuminance of light, which is irradiated onto a data area 30b (see FIG. 4) through the diffuser 13 and via a light leading member 55 (see FIG. 4).

As described above, the electro-developing recording medium 30 is provided with the recording area 30a and the data area 30b, which is provided outside of the recording area 30a so that a light beam from the photographing optical system 12 is not directed to the data area 30b. By performing a photographing operation, a color image is recorded in the recording area 30a through the first color filter 53. An electric voltage is applied to the electro-developing recording medium 30 under the control of a recording medium drive circuit 41. By exposing the electro-developing recording medium 30 while applying this voltage, a color image, which is formed by the photographing optical system 12, is developed on the electro-developing recording medium 30 as a visible image. Note that the recording medium drive circuit 41 is operated in accordance with a command signal outputted by the system control circuit 20.

Also, by performing the photographing operation, optical information, which is data needed for a white balance adjustment, is formed in the data area 30b of the electro-developing recording area 30 through the second color filter 54. The data area 30b has first, second, and third portions whose transmittances are changed in accordance with the amount of exposure to each of the components red (R), green (G), and blue (B), so that the information needed for the white balance adjustment is optically recorded in the data area 30b. Note that the amount of exposure is the amount of energy per unit time for each color component.

Thus, in the photographing operation, an object image is recorded in the recording area 30a, and the optical information needed for the white balance adjustment is recorded in the data area 30b. Note that, in the electro-developing recording medium 30 used in this embodiment, the greater the amount of exposure, the higher the level of transmittance.

The diffuser 13 operates in such a manner that the illuminance of light led to the data area 30b is uniformly distributed over the data area 30b. The light leading member 55, which is hollow object having a square section, is provided between the diffuser 13 and the shutter 22. Namely, light entering the diffuser 13 passes through the inside of the light leading member 55, and is led to the data area 30b through the second color filter 54.

The electro-developing recording medium 30 can be moved linearly by a recording medium moving mechanism 51, which is controlled by the system control circuit 20. Namely, in a photographing operation, the electro-developing recording medium 30 is still, and when the image recorded in the electro-developing recording medium 30 is read, the electro-developing recording medium 30 is moved by the recording medium moving mechanism 51. In this reading operation, the optical information (i.e. transmittance), which is formed in the data area 30b to perform the white balance adjustment, is read by a line sensor 44, and then, the image formed in the recording area 30a is read by the line sensor 44.

For the reading operation, a light source 42, and first and second scanner optical system 43a and 43b are provided besides the line sensor 44. The light source 42 is composed of an LED (i.e. a photodiode), for example, and the first and second scanner optical systems 43a and 43b are provided for forming an image on the line sensor 44. The light source 42 and the first scanner optical system 43a are disposed forward of the electro-developing recording medium 30, i.e., the side of the photographing optical system 12, and the second scanner optical system 43b and the line sensor 44 are disposed aft of the electro-developing recording medium 30. Namely, in the reading operation, the optical information recorded in the data area 30b and the image recorded in the recording area 30a are illuminated by the light source 42 and the first scanner optical system 43a, and are formed on the light receiving surface of the line sensor 44 due to an operation of the second scanner optical system 43b. Note that the line sensor 44 may be a one dimensional CCD sensor of 2000 pixels, for example.

ON and OFF control of the light source 42 is performed by a light source drive circuit 45, and the control of the reading operation of pixel signals generated in the line sensor 44 is carried out by a line sensor drive circuit 47. The circuits 45 and 47 are controlled by the system control circuit 20.

Pixel signals read out from the line sensor 44 are amplified by an amplifier 61, and converted to a digital signal by an A/D converter 62. The digital pixel signals are subjected to a shading correction, a gamma correction, a gain control for a white balance adjustment described above and so on by an image processing circuit 63 under the control of the system control circuit 20, and then temporarily stored in a memory 64. The memory 64 includes an EEPROM in which correction data for the shading correction is stored. The memory 64 has a storage capacity equal to one frame of pixel signals.

The pixel signals read from the memory 64 are inputted to an interface circuit 65 through the image processing circuit 63, so that the pixel signals are subjected to a predetermined process such as a format conversion, and can then be outputted to an external computer (not shown) through the output terminal 17. The pixel signals outputted from the image process circuit 63 are subjected to a predetermined process such as an image compression and a format conversion in a recording device control circuit 66, so that the pixel signals can be recorded on a recording medium such as an IC memory card, for example, in an image recording device 67. The interface circuit 65 and the recording device control circuit 66 are operated in accordance with a command signal outputted from the system control circuit 20.

The release switch 14 and the scan start switch 16 are connected to the system control circuit 20. A photographing operation and a reading operation are performed by operating the release switch 14 and the scan start switch 16, respectively. A display device 68 is connected to the system control circuit 20 to indicate various setting conditions of the electro-developing type camera.

Figure 3:
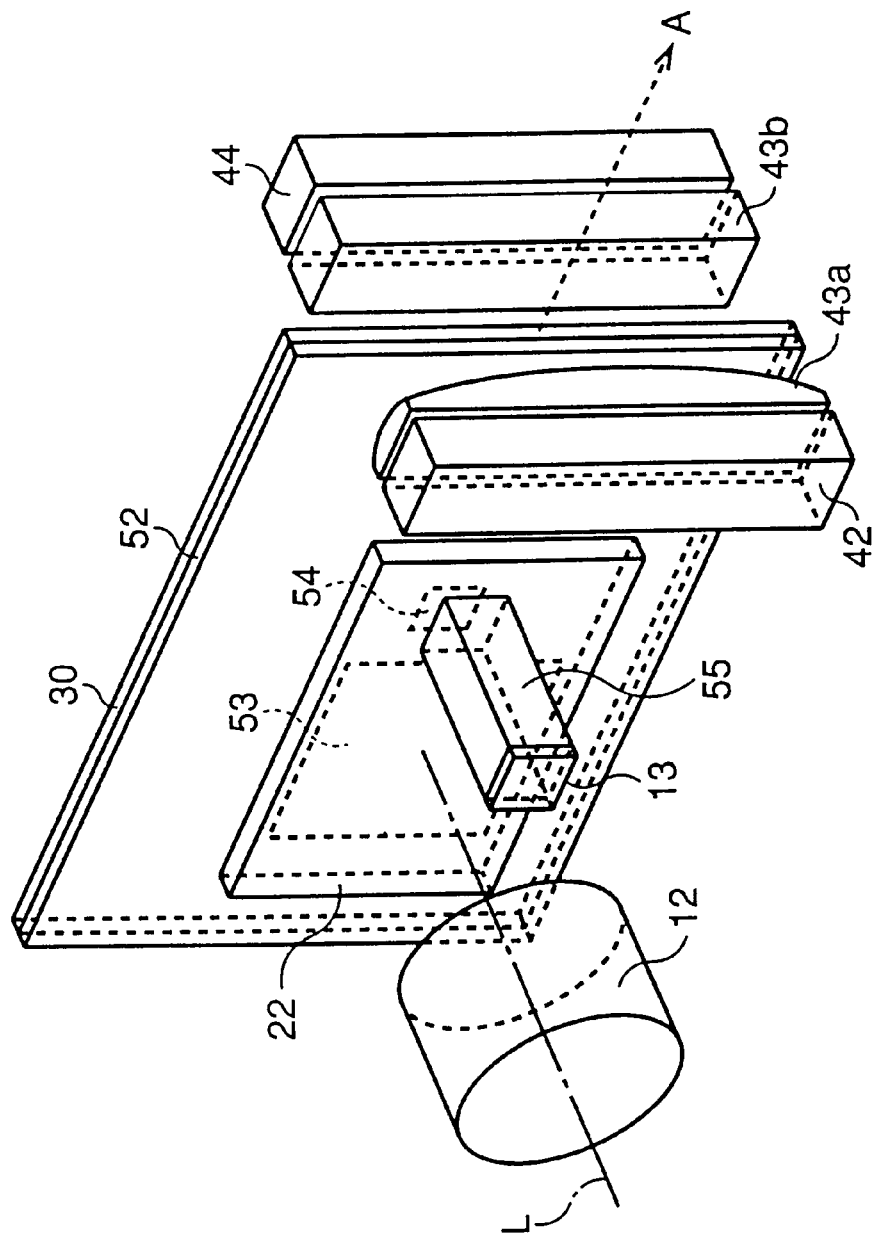
FIG. 3 is a perspective view showing a mechanism provided close to a portion where an electro-developing recording medium is disposed.
Figure 4:
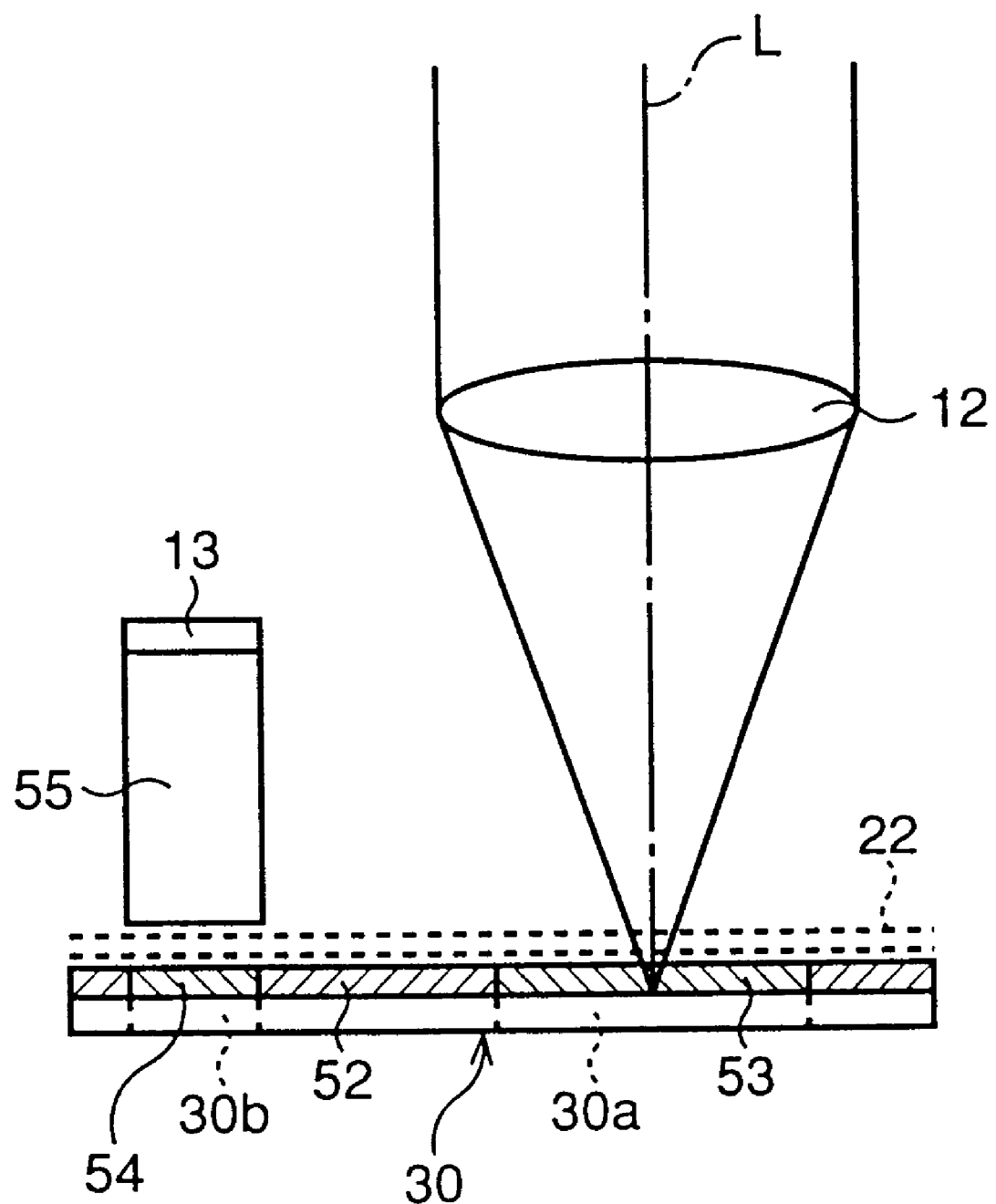
FIG. 4 is a plane view showing the mechanism shown in FIG. 3.

FIG. 3 is a perspective view showing a mechanism provided close to a portion where the electro-developing recording medium 30 is disposed. FIG. 4 is a view showing this mechanism when viewing from the view-finder optical system 23. The mask member 52 and the first and second color filters 53 and 54 are shown as sectional views.

The electro-developing recording medium 30 can be moved from a position behind the mask member 52 in a horizontal direction shown by reference (A) in FIG. 3, and is moved between the first and second scanner optical systems 43a and 43b in a reading operation. The first and second optical systems 43a and 43b, the light source 42, and the line sensor 44 are extended in a vertical direction, so that an image formed in the electro-developing recording medium 30 can be read one line by one line. The light leading member 55 is extended in a direction vertical to the light receiving surface of the electro-developing recording medium 30, i.e., a direction parallel to the optical axis L of the photographing optical system 12.

Figure 5:
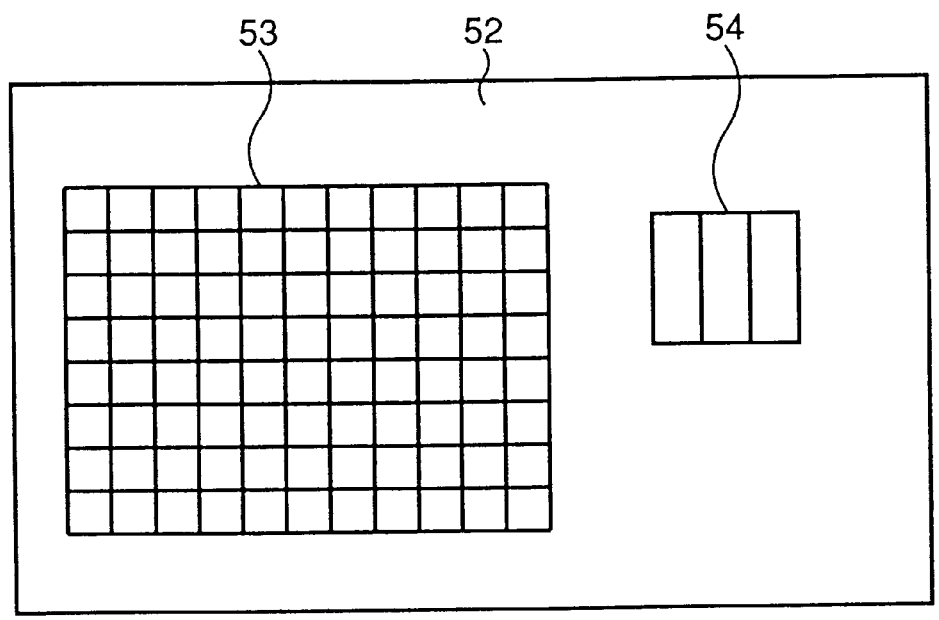
FIG. 5 is a front view showing an arrangement of first and second color filters fixed in the mask member.

FIG. 5 shows an arrangement of the first and second color filters 53 and 54 fixed in the mask member 52. The first color filter 53 is disposed at a position corresponding to the recording area 30a of the electro-developing recording medium 30, and has approximately the same dimensions as that of the recording area 30a. The second color filter 54 is disposed at a position corresponding to the data area 30b of the electro-developing recording medium 30, and has approximately the same dimensions as that of the data area 30b. Note that the proportion between the first and second color filters 53 and 54 as shown in FIG. 5 is different from that of the actual device.

Figure 6:
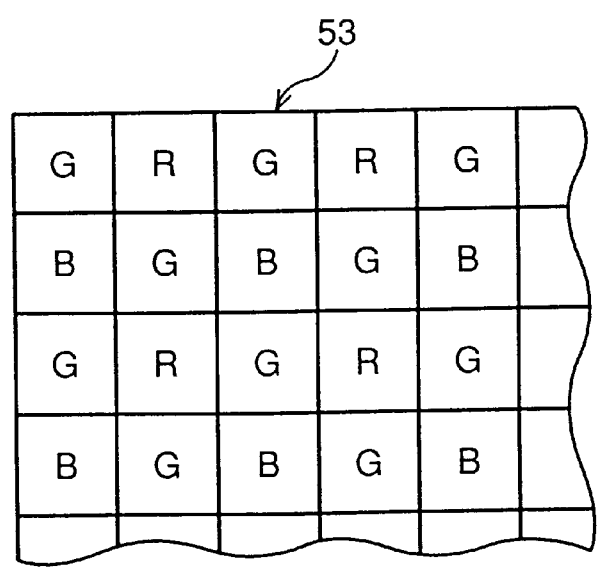
FIG. 6 is a view showing an arrangement of color filter elements of the first color filter.

As shown in FIG. 6, the first color filter 53 has R-filter elements, G-filter elements, and B-filter elements, which are arranged in a checkerboard arrangement, as is well known. The pitch between each of the filter elements is equal to a pitch of each of the pixels provided in the line sensor 44, and is equal to a pitch by which the electro-developing recording medium 30 is moved in the reading operation.

Figure 7:
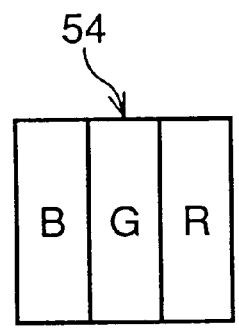
FIG. 7 is a view showing an arrangement of color filter elements of the second color filter.

As shown in FIG. 7, the second color filter 54 has R-filter elements, G-filter elements, and B-filter elements, which are arranged in a stripe extended in the same direction as the line sensor 44.

Figure 8:
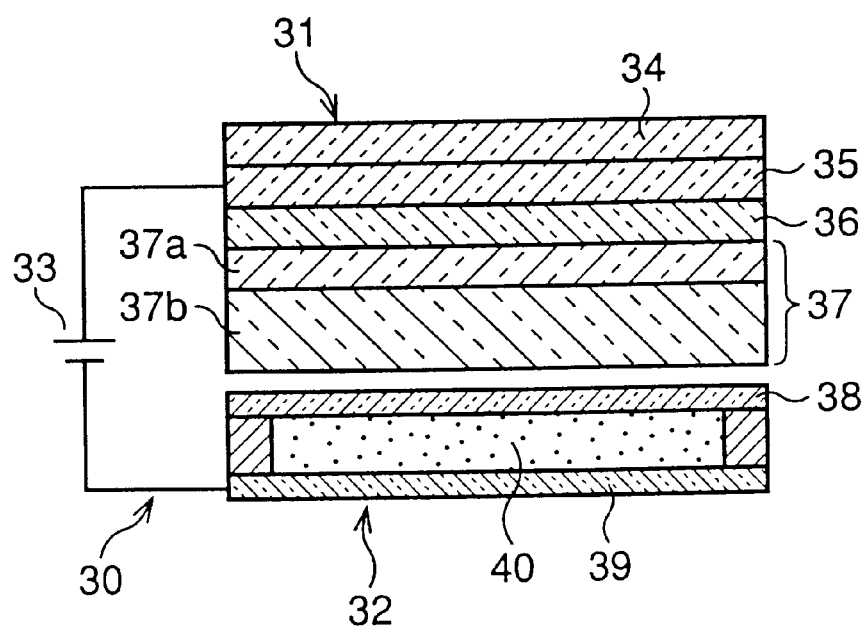
FIG. 8 is a sectional view showing a structure of the electro-developing recording medium.

FIG. 8 shows a structure of the electro-developing recording medium 30, which is basically the same as an electro-developing recording medium shown in Japanese Unexamined Patent Publication No. 5-2280.

The electro-developing recording medium 30 has an electrostatic information recording medium 31 and an electric charge storage medium 32. An electric voltage is applied thereto by an electric power source 33. The electric power source 33 corresponds to the recording medium drive circuit 41, so that ON-OFF control of the electric power source 33 is an operation in which the recording medium drive circuit 41 applies a recording medium activating signal (a voltage signal) to the electro-developing recording medium 30.

The electrostatic information recording medium 31 is formed by laminating a base plate 34, an electrode layer 35, an inorganic oxide material layer 36, and a photoconducting layer 37. The photoconducting layer 37 is formed by laminating an electric charge generating layer 37a and an electric charge transferring layer 37b. The electric charge storage medium 32 is formed by confining liquid crystal 40 between a liquid crystal supporting plate 38 and a liquid crystal electrode layer 39. The electric charge transferring layer 37b of the photoconducting layer 37 and the liquid crystal supporting plate 38 of the electric charge storage medium 32 face each other with a small gap between them.

When the electric power source 33 is turned ON, an electric voltage is applied between the electrode layer 35 and the liquid crystal electrode layer 39, i.e., between the electrostatic information recording medium 31 and the electric charge storage medium 32. When the electrostatic information recording medium 31 is exposed while the electric voltage is applied, an electric charge is generated in the electrostatic information recording medium 31 in accordance with an image formed thereon. Since the intensity of the electric field applied to the liquid crystal display 40 is changed in accordance with the electric charge, the image is indicated on the liquid crystal display 40 as a visible image, and thus, an object image is developed. Namely, the visible image is generated in accordance with the electric charge.

The electric charge storage medium 32 is a liquid crystal display having a memory-type liquid crystal, and thus, the developed visible image is held therein even if the electric field is removed. The developed visible image of the LCD can be erased by heating it, using a heating device (not shown) to a predetermined temperature. As a result, the same electric charge storage medium 32 can be used repeatedly.

Figure 9:
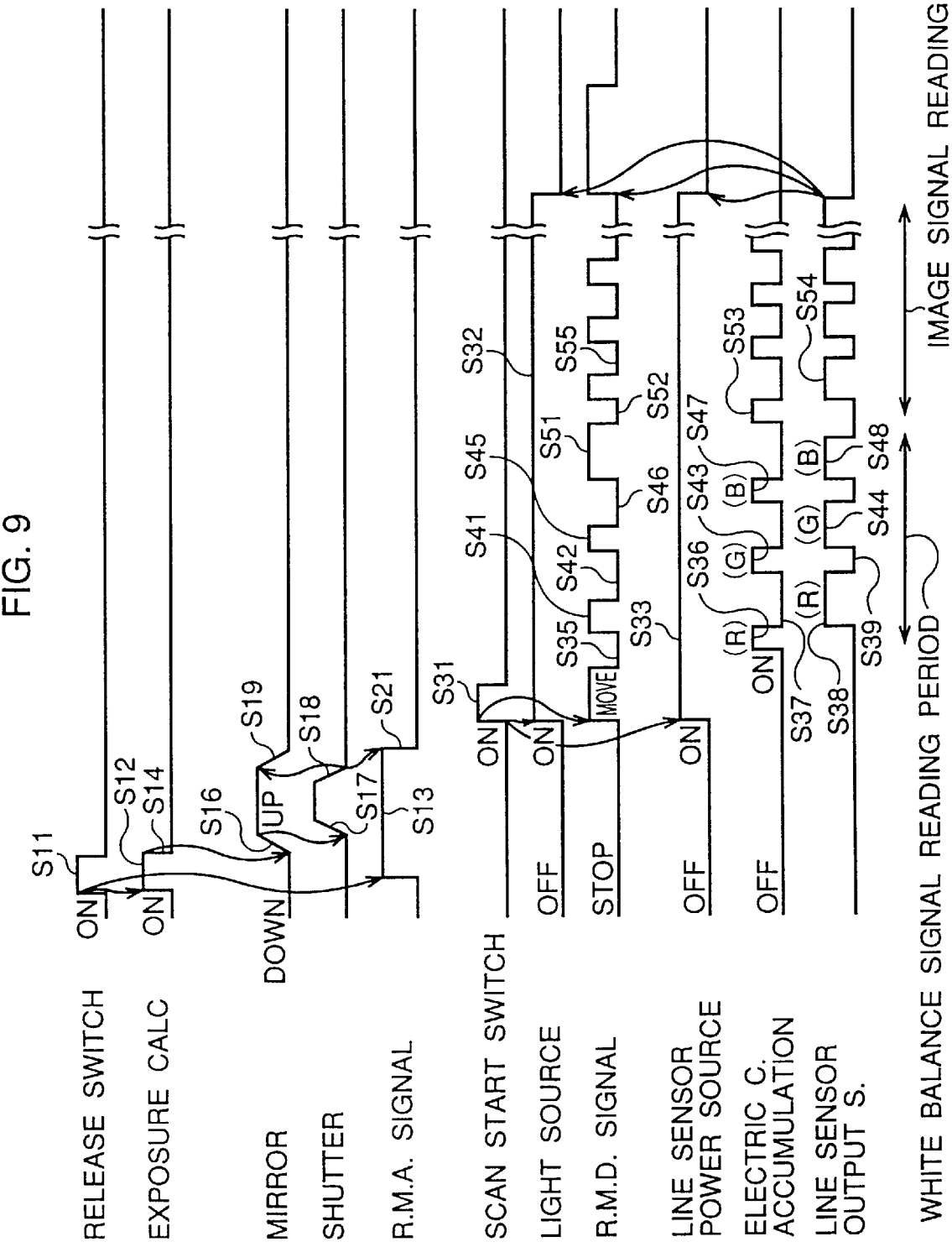
FIG. 9 is a timing chart showing a photographing operation of the first embodiment.
Figure 10:
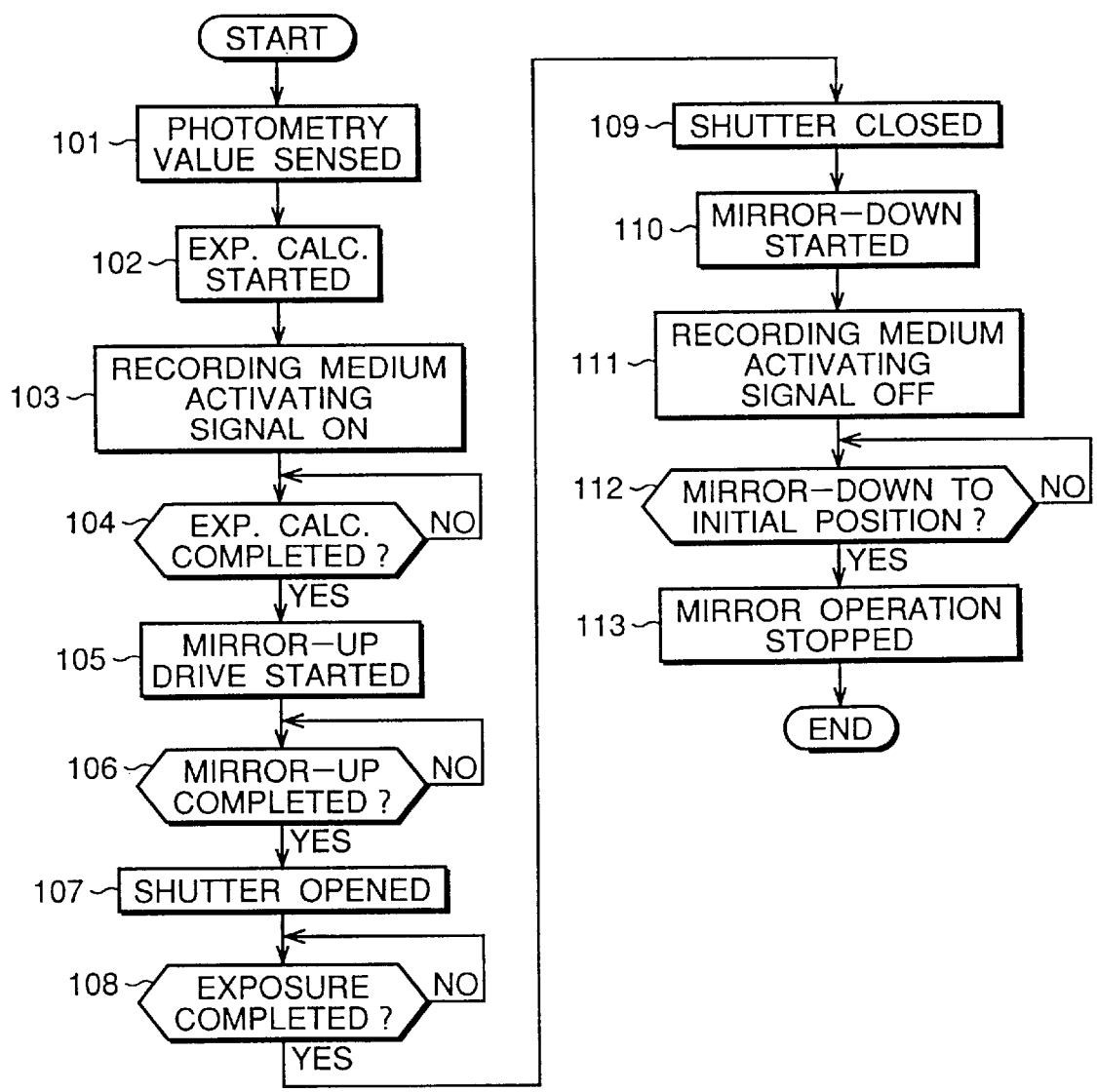
FIG. 10 is a flow chart of a program for performing the recording operation.
Figure 11A:
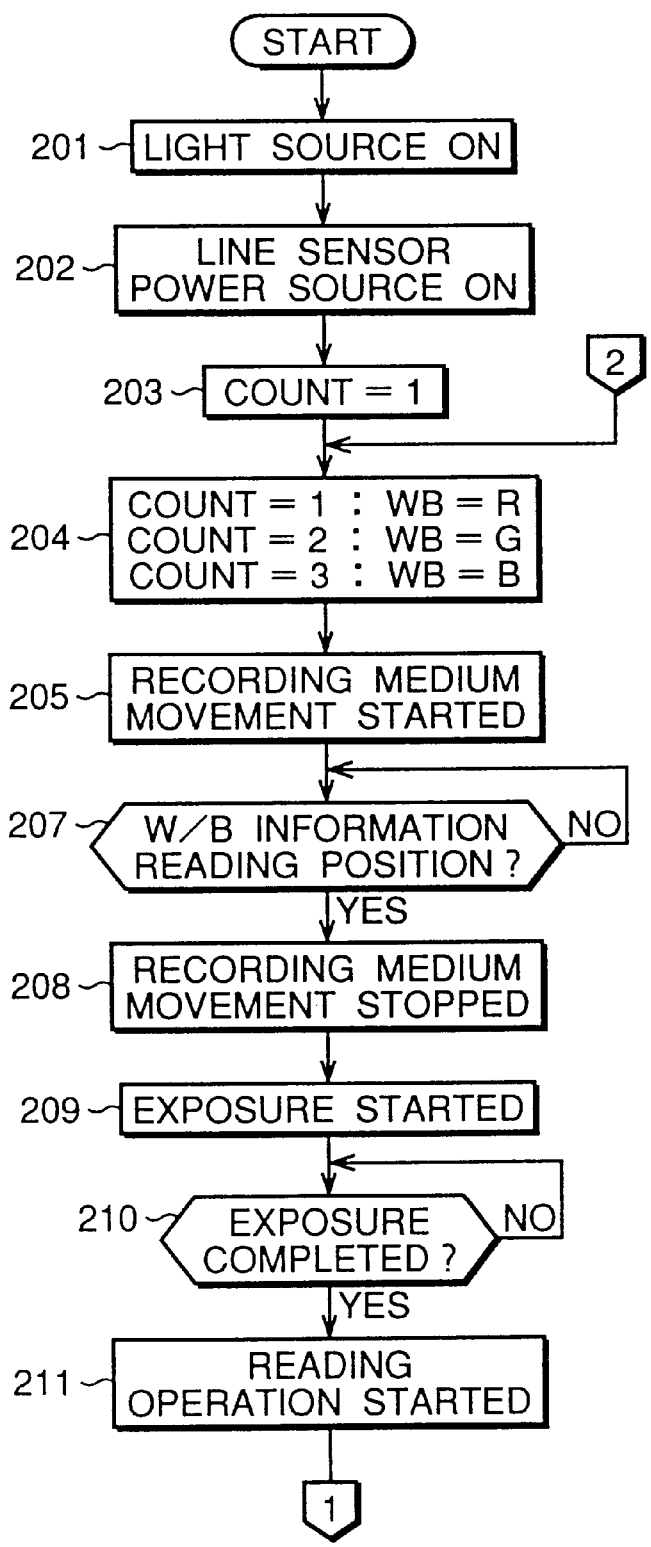
FIGS. 11A, 11B, 11C, and 11D are flow charts of a program for performing the reading operation.
Figure 11B:
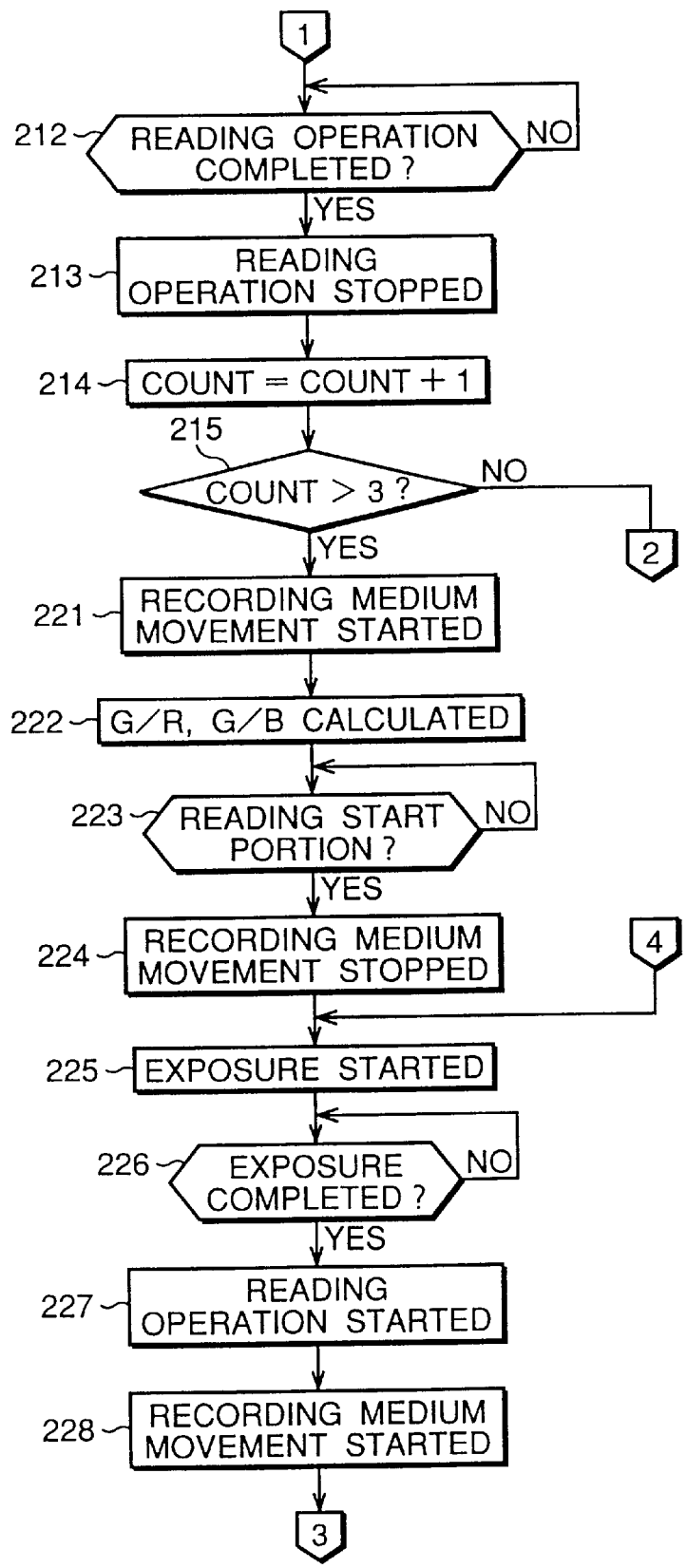
Figure 11C:
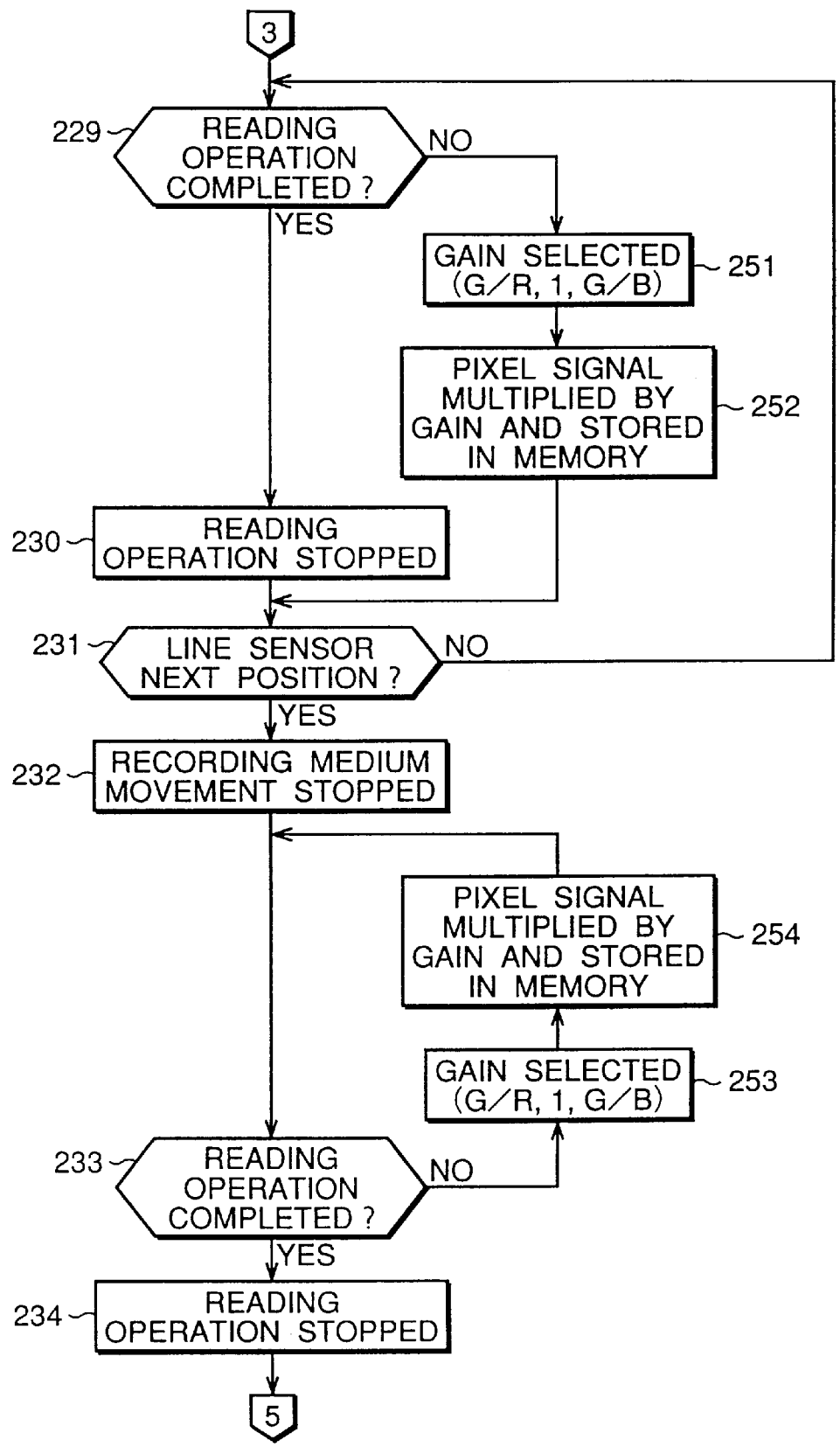
Figure 11D:
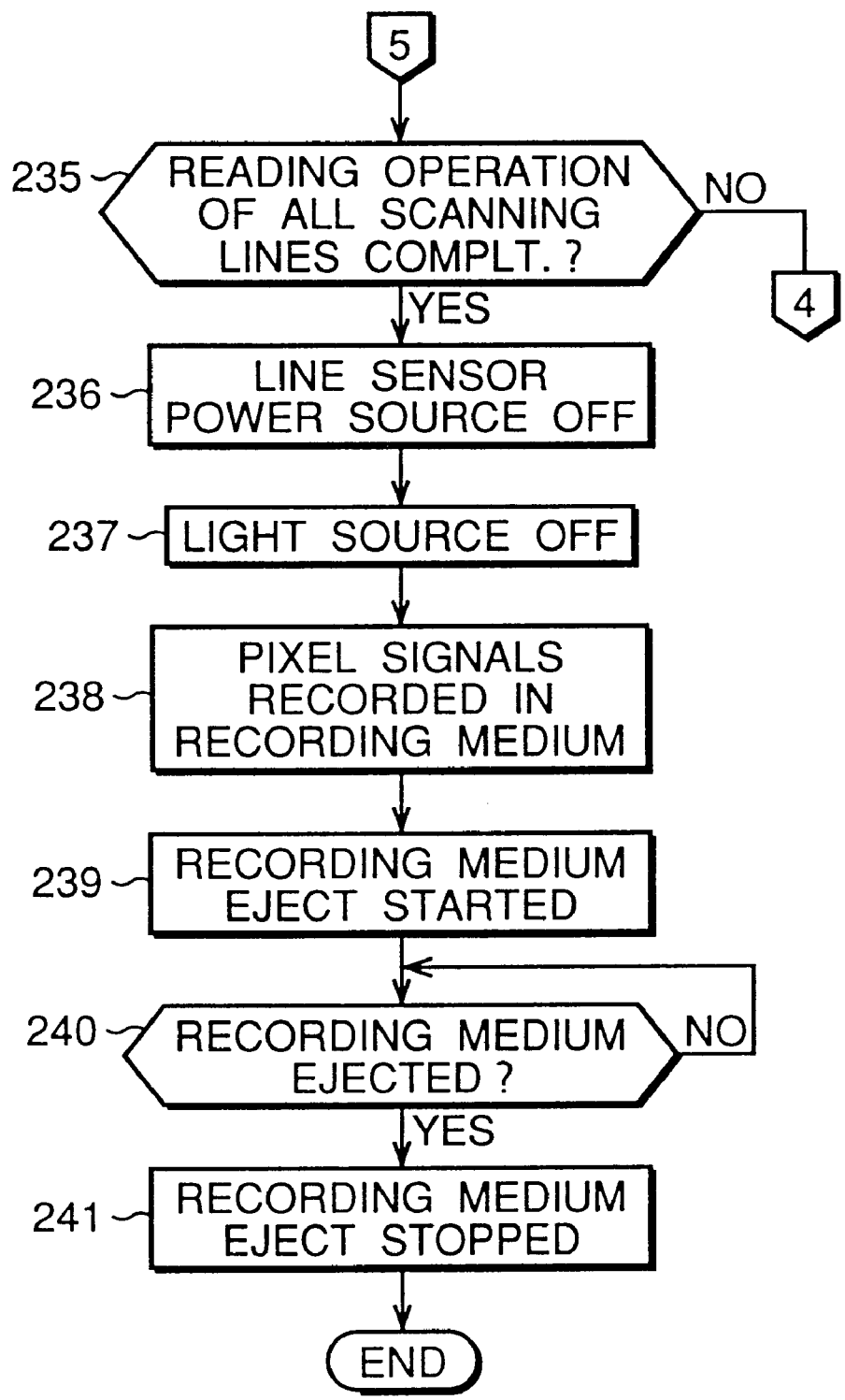

FIG. 9 is a timing chart showing a recording operation in which an image is recorded in the electro-developing recording medium 30, and a reading operation in which the image is read therefrom. FIG. 10 is a flow chart of a program for performing the recording operation. FIGS. 11A, 11B, 11C, and 11D are flow charts of a program for performing the reading operation.

The program of the recording operation is started when the release switch 14 is turned ON (reference S11 in FIG. 9). In Step 101, an output signal of the photometry sensor 28, i.e., the photometry value, is sensed, and in Step 102, an exposure calculation is started based on the photometry value (reference S12 in FIG. 9). After a predetermined time has passed since the release switch 14 has been turned ON, a recording medium activating signal is outputted (reference S13 in FIG. 9) in Step 103, so that the electric power source 33 is turned ON, and thus, an electric voltage is applied to the electrostatic information recording medium 31 and the electric charge keeping medium 32. When it is confirmed in Step 104 that the exposure calculation has been completed (reference S14 in FIG. 9), then in Step 105 and the following Steps, the recording operation is carried out in accordance with the calculation result.

In Step 105, the quick return mirror 21 is changed from the down condition to the up condition (reference S16 in FIG. 9). When it is confirmed in Step 106 that the quick return mirror 21 has been changed to the up condition, the shutter 22 is opened in Step 107 (reference S17 in FIG. 9). When it is the exposure period determined by the exposure calculation has passed and it is sensed in Step 108 that the exposure has been completed, the shutter 22 is closed in Step 109 (reference S18 in FIG. 9). By the completion of the closing operation of the shutter 22, Step 110 is executed so that the quick return mirror 21 is changed to the down condition (reference S19 in FIG. 9). In Step 111, the output of the recording medium activating signal is stopped (reference S21 in FIG. 9).

Namely, the recording medium activating signal is outputted at least for the period while the shutter 22 is opened, and during this period, a predetermined voltage is applied to the electro-developing recording medium 30. Then, by exposing the electro-developing recording medium 30 under the voltage applied condition, the object image is developed on the electro-developing recording medium 30 as a visible object image. This visible object image is kept even if the output of the recording medium activating signal is stopped.

When it is confirmed in Step 112 that the quick return mirror 21 has returned to its initial position, the operation of the quick return mirror 21 is stopped in Step 113, and thus the program of the recording operation ends.

The program of the reading operation is started by turning ON the scan start switch 16 (reference S31 in FIG. 9). In Step 201, the light source 42 is lit (reference S32 in FIG. 9), and then, in Step 202, an electric power source for driving the line sensor 44 is turned ON (reference S33 in FIG. 9).

In Step 203, a counter "COUNT" is set to 1. In Step 204, a parameter "WB" is set to "R" when the counter "COUNT" has the value of 1, the parameter "WB" is set to "G" when the counter "COUNT" has the value of 2, and the parameter "WB" is set to "B" when the counter "COUNT" has the value of 3. Namely, the value of the counter "COUNT" corresponds to the R, G, and B components which are used in the white balance adjustment.

In Step 205, a recording medium drive signal is outputted (reference S34), so that a scan drive motor included in the recording medium moving mechanism 51 is rotated in a forward direction, and thus the electric-developing recording medium 30 starts to move in the direction of the arrow A marked in FIG. 3. When it is confirmed in Step 207 that the data area 30b of the electro-developing recording medium 30 is set at a white balance information reading position, i.e., a position corresponding to the line sensor 44, the output of the recording medium drive signal is stopped in Step 208 (reference S35), and thus the movement of the electro-developing recording medium 30 is stopped. This stopping operation is controlled by counting pulse signals for rotating the scan drive motor. When Step 208 is executed for the first time, the counter "COUNT" is 1, and thus, the electro-developing recording medium 30 is stopped at a position where a portion, which is included in the data area 30b and corresponds to the R-filter element of the second color filter 54, faces the line sensor 44.

In Step 209, an exposure of the line sensor 44 is started, so that an accumulation of an electric charge by the line sensor 44 is performed (reference S36 in FIG. 9). When it is confirmed in Step 210 that the exposure of the line sensor 44 has been completed (reference S37 in FIG. 9), a reading operation of the line sensor 44 is started in Step 211 (reference S38 in FIG. 9). Namely, pixel signals corresponding to the amount of exposure of the R component formed in the data area 30b are read from the line sensor 44. When it is confirmed in Step 212 that pixel signals of one line have been outputted from the line sensor 44, the reading operation of the line sensor 44 is stopped in Step 213 (reference S39 in FIG. 9). The average value of the pixel signals of one line corresponds to the amount of R component in the photographing operation. Note that the completion of the reading operation is controlled by counting the pulse signals used for driving the line sensor 44.

In Step 214, the counter "COUNT" is increased by the increment of one. When it is determined in Step 215 that the value of the counter "COUNT" is not greater than 3, the process returns to Step 204, and thus, the operations described above are again executed.

When the counter "COUNT" is set to 2, the electro-developing recording medium 30 is stopped at a position where a portion, which is included in the data area 30b and corresponds to the G-filter element of the second color filter 54, faces the line sensor 44 (references S41 and S42 in FIG. 9). In this state, the electric charge accumulation is carried out (reference S43 in FIG. 9), and thus, pixel signals corresponding to the amount of the exposure of G component formed in the data area 30b are read from the line sensor 44 (reference S44 in FIG. 9). When the counter "COUNT" is set to 3, the electro-developing recording medium 30 is stopped at a position where a portion, which is included in the data area 30b and corresponds to the B-filter element of the second color filter 54, faces the line sensor 44 (references S45 and S46 in FIG. 9). In this state, the electric charge accumulation is carried out (reference S47 in FIG. 9), and thus, pixel signals corresponding to the amount of exposure of B component formed in the data area 30b are read from the line sensor 44 (reference S48 in FIG. 9).

Thus, the pixel signals corresponding to the amount of exposure of R, G, and B components, i.e., information needed for the white balance adjustment are read through the line sensor 44. Then, it is determined in Step 215 that the value of the counter "COUNT" is greater than 3, and in Step 221 and in the following steps, the image recorded in the recording area 30a of the electro-developing recording medium 30 is read therefrom.

In Step 221, the scan drive motor is rotated in the forward direction, so that the electro-developing recording medium 30 starts to move in the direction of the arrow A marked in FIG. 3 (reference S51 in FIG. 9). In Step 222, based on the pixel signals corresponding to the transmittances of each of the data areas of R, G, and B components, reading gains of R-images and B-images, i.e., G/R and G/B are calculated. Namely, the reading gains are set based on the G component, so that the gain of color component, in which the amount of exposure is relatively large, is small, and the gain of the color component, in which the amount of exposure is relatively small, is large, and thus the balance of the color temperature is adjusted. The gain the G-component is 1.

In Step 223, it is determined whether or not the reading start portion of the electro-developing recording medium 30 has been set to face the line sensor 44. The reading start portion is the end portion which is included in the recording area 30a and is positioned closest to the data area 30b. When it is confirmed that the reading start portion faces the line sensor 44, the process goes from Step 223 to Step 224, in which the movement of the electro-developing recording medium 30 is stopped (reference S52 in FIG. 9). Then, the exposure of the line sensor 44 is started in Step 225 so that the electric charge accumulation is carried out (reference S53 in FIG. 9). When it is confirmed in Step 226 that the exposure of the line sensor 44 has been completed, by sensing that a predetermined constant time has passed, the reading operation of the line sensor 44 is started in Step 227, and thus, pixel signals of one line begin to be outputted through the line sensor 44 (reference S54 in FIG. 9). Then, in Step 228, a drive signal for rotating the scan drive motor in the forward direction is outputted, so that the electro-developing recording medium 30 starts to move.

The reading operation of the line sensor 44 is performed for every line, which is extended in a vertical direction in FIG. 6. Therefore, the pixel signals are outputted from the line sensor 44 in the order of G, B, G, B, . . . or R, G, R, G, . . . in accordance with the line that is in-line with the line sensor 44.

During the movement of the electro-developing recording medium 30, when the completion of the reading operation of the line sensor 44 is not confirmed in Step 229, Step 251 is executed, so that the gain is selected in accordance with the color of the pixel signal which is being outputted from the line sensor 44. Namely, when that color is red, the gain (G/R) is selected, when that color is green, the gain (1) is selected, and when that color is blue, the gain (G/B) is selected. Then, in Step 252, the pixel signal is multiplied by the selected gain, and is stored in the memory 64. Namely, the pixel signal which has been subjected to the white balance adjustment is stored in the memory 64. In Step 231, it is confirmed whether the line sensor 44 has been set at the position of the next scanning line, i.e., the next reading position. When the line sensor 44 has not been set at the position of the next scanning line, the process returns to Step 229.

Conversely, when it is confirmed in Step 229 that the reading operation of the line sensor 44 has been completed, the reading operation is stopped in Step 230 and the storing operation in which the pixel signals are stored in the memory 64 is stopped. Then, the process goes to Step 231.

When it is confirmed in Step 231 that the line sensor 44 has been set at the position of the next scanning line, the movement of the electro-developing recording medium 30 is stopped in Step 232 (reference S55 in FIG. 9). Then, in Step 233, the completion of the reading operation of the line sensor 44 is confirmed, in the same way as for Step 229. Namely, when the completion of the reading operation is not confirmed, Step 253 is executed, so that the gain is selected in accordance with the color of the pixel signal, and in Step 254, the pixel signal is multiplied by the selected gain, and is stored in the memory 64. Conversely, when the completion of the reading operation is confirmed, the process goes from Step 233 to Step 234, in which the reading operation and the storing operation to the memory 64 are stopped.

Thus, even when the loop composed of Steps 229, 230, 231, 251, and 252 is ended without executing Step 230, the reading operation of the line sensor 44 is completed in Step 234.

In Step 235, it is determined whether the reading operation for all of the scanning lines has been completed, by counting the value of a counter which has been counted in Step 232. The number of all of the scanning lines may be 2000, for example. When the reading operation of all of the scanning lines has not been completed, the process returns to Step 225, and the operations of Steps 225 through 235 described above are repeated.

When all of the scanning lines have been read out, the process goes from Step 235 to Step 236. In Step 236, the drive power source of the line sensor 44 is turned OFF, and in Step 237, the light source 42 is turned OFF. In Step 238, the pixel signals stored in the memory 64 are subjected to an image processing such as an image compression, and recorded in a recording medium mounted in the image recording device 67. In Step 239, the scan drive motor is driven so that the electro-developing recording medium 30 is fed through the slot formed in the camera body 11. When it is confirmed in Step 240 that the electro-developing recording medium 30 has been ejected outside of the camera body 11, the scan drive motor is stopped in Step 241, and this program ends.

As described above, in the first embodiment, the information needed for the white balance adjustment is recorded in the data area 30b of the electro-developing recording medium 30, as optical information. Further, when the color image recorded in the electro-developing recording medium 30 is read through the line sensor 44, the optical information (i.e., the white balance information of R, G, and B) is read from the electro-developing recording medium 30, so that the gains G/R and G/B of the white balance adjustment are calculated. When pixel signals of each scanning line, which forms a part of the image, are stored in the memory 64, these gains are multiplied by the pixel signals. Therefore, a circuit such as a white balance signal processing circuit for carrying out the white balance adjustment does not need to be provided in the camera body 11, and thus the circuit construction provided in the camera body 11 can be simplified.

Furthermore, since the white balance adjusting device is constructed in such a manner that the color image recorded in the recording area 30a is read after the optical information for the white balance adjustment is read, it is not necessary that the pixel signals are once stored in a memory, and then are multiplied by the gain, which would be a complicated process.

Figure 12:
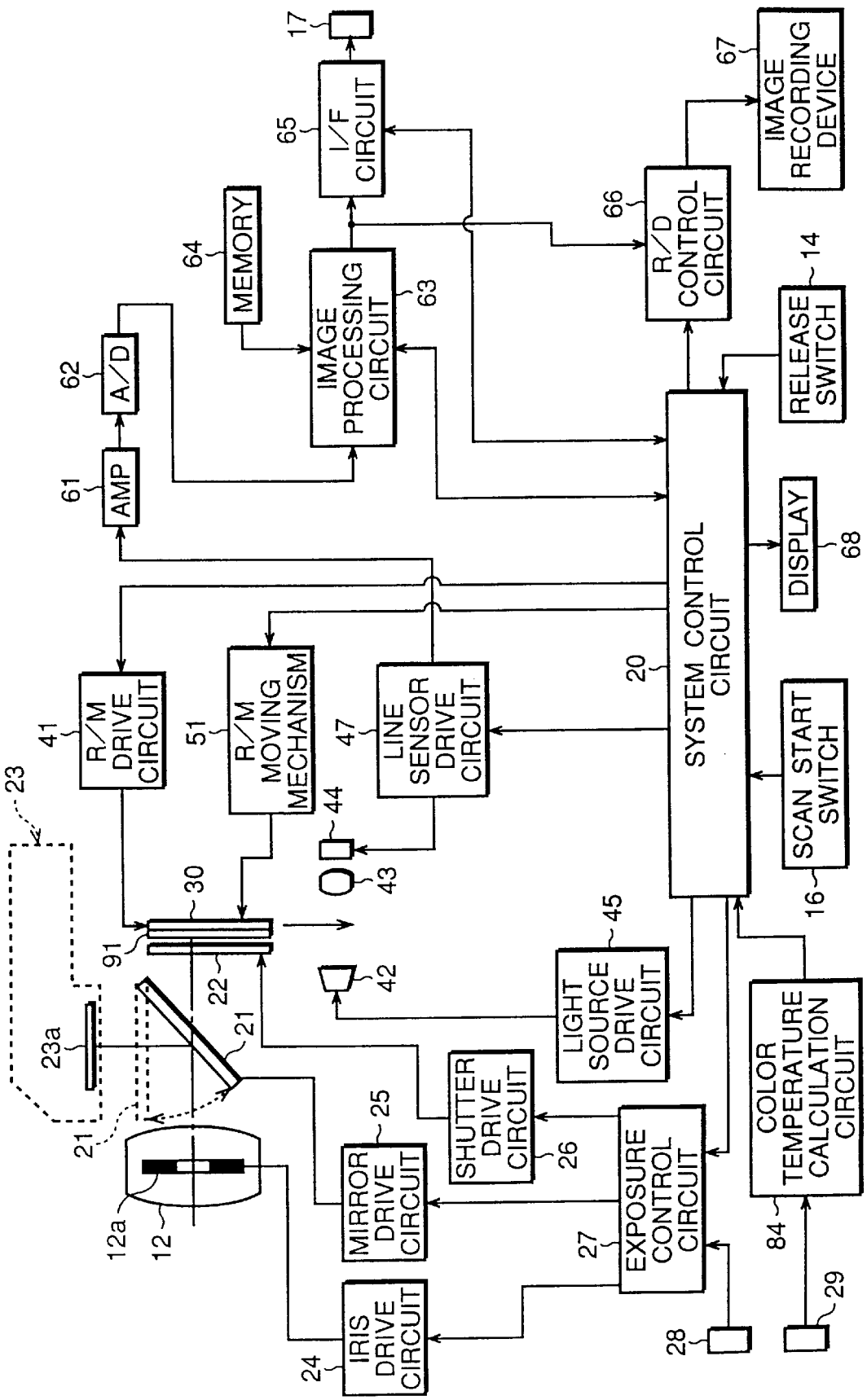
FIG. 12 is a block diagram of the electro-developing type camera to which a second embodiment of the present invention is applied.

FIG. 12 is a block diagram of the electro-developing type camera to which a second embodiment of the present invention is applied. Note that the external view of the electro-developing type camera of the second embodiment is basically the same as that shown in FIG. 1.

In the second embodiment, the aperture 12a provided in the photographing optical system 12 is opened and closed by an iris drive circuit 24. Namely, when an exposure is controlled, the degree of opening of the aperture 12a is adjusted by the iris drive circuit 24 under the control of the exposure control circuit 27 based on a signal outputted by the photometry sensor 28.

A color filter 91 is provided in front of the electro-developing recording medium 30. The color filter 91 has R-, G-, and B-filter elements, which are arranged in accordance with a checkerboard arrangement shown in FIG. 6.

A scanner optical system 43 is provided aft of the electro-developing recording medium 30, and not split into two parts as in the first embodiment, shown in FIG. 2.

The other constructions are the same as those of the first embodiment.

Figure 13:
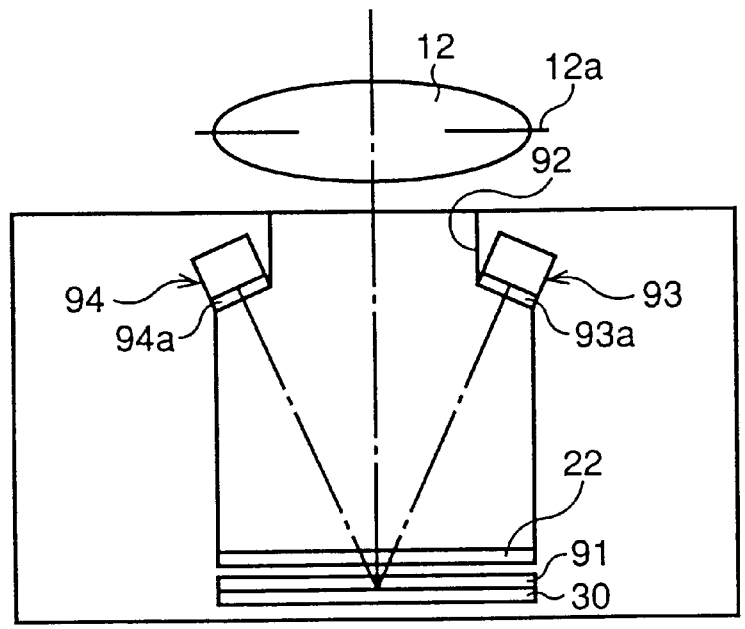
FIG. 13 is a view showing a structure, which is provided close to a portion where the photographing optical system and the electro-developing recording medium are provided in the second embodiment, when viewing from a view-finder optical system.
Figure 14:
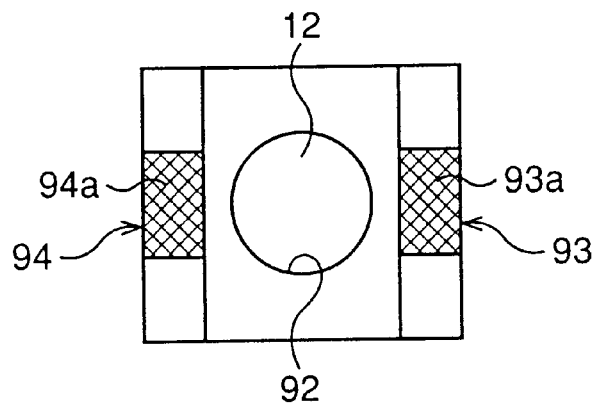
FIG. 14 is a view showing the photographing optical system in the second embodiment when viewing from the electro-developing recording medium.

FIG. 13 is a view showing a structure, which is provided close to a portion where the photographing optical system 12 and the electro-developing recording medium 30 are provided, when viewing from the view-finder optical system 23 (see FIG. 2). FIG. 14 is a view showing the photographing optical system 12 when viewing from the electro-developing recording medium 30.

As shown in these drawings, an opening 92 is formed in a portion close to the photographing optical system 12 and facing the shutter 22, and first and second illumination mechanisms 93 and 94 are fixed beside the opening 92. These illumination mechanisms 93 and 94 are provided for radiating a flash light onto the electro-developing recording medium 30 in a photographing operation. The first illumination mechanism 93 radiates a flash light having a first color temperature, and the second illumination mechanism 94 radiates a flash light having a second color temperature which is different from the first color temperature. Diffusers 93a and 94a are provided on the radiating surfaces of the first and second illumination mechanisms 93 and 94 so that the flash lights are uniformly radiated on the light receiving surface of the electro-developing recording medium 30. As shown in FIG. 14, the first and second illumination mechanisms 93 and 94 are extended in parallel to each other, and the lengths of the illumination mechanisms 93 and 94 are approximately the same as that of the opening 92.

Figure 15:
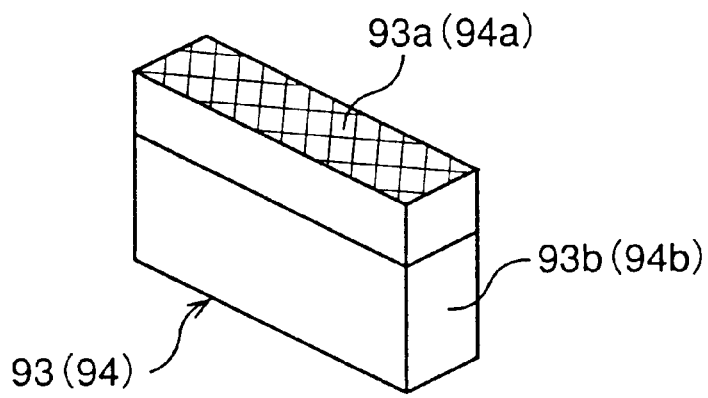
FIG. 15 is an external view of the first and second illumination mechanisms.

FIG. 15 shows an external view of the first and second illumination mechanisms 93 and 94. As shown in this drawing, the diffusers 93a and 94a are provided over the entire length of housings 93b and 94b of the illumination mechanisms 93 and 94. In each of the housings 93b and 94b, a xenon lamp (not shown), which radiates a flash light, is housed.

Figure 16:
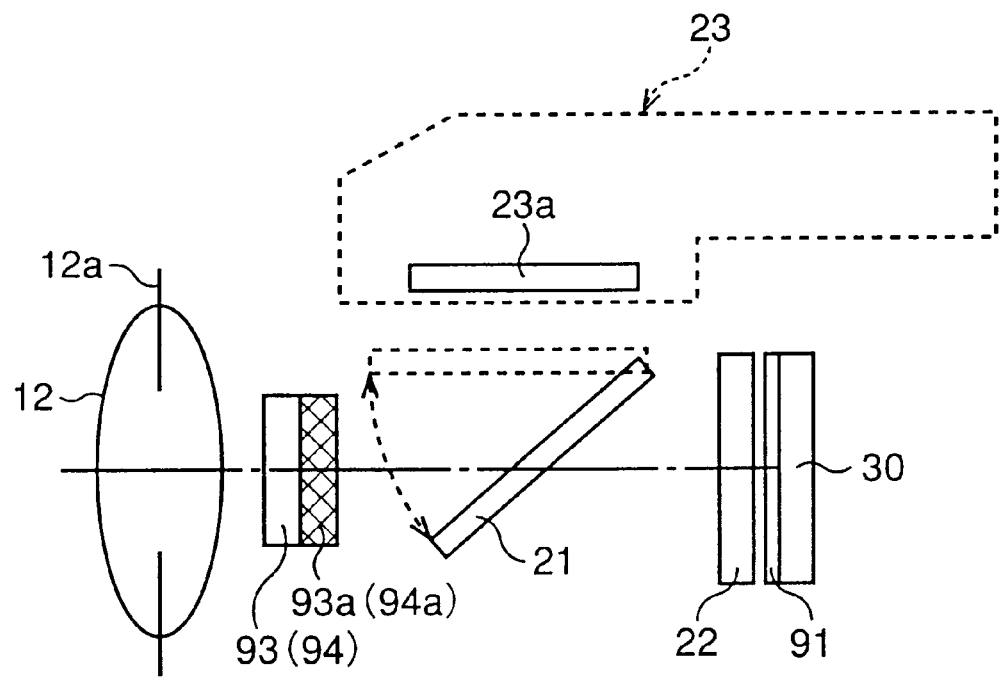
FIG. 16 is a view showing a positional relationship of the first and second illumination mechanisms to the other members.

FIG. 16 shows a positional relationship between the first and second illumination mechanisms 93 and 94 and the other members. These illumination mechanisms 93 and 94 are positioned between the photographing optical system 12 and the quick return mirror 21 in such a manner that the rotation of the quick return mirror 21 is not disturbed.

Figure 17:
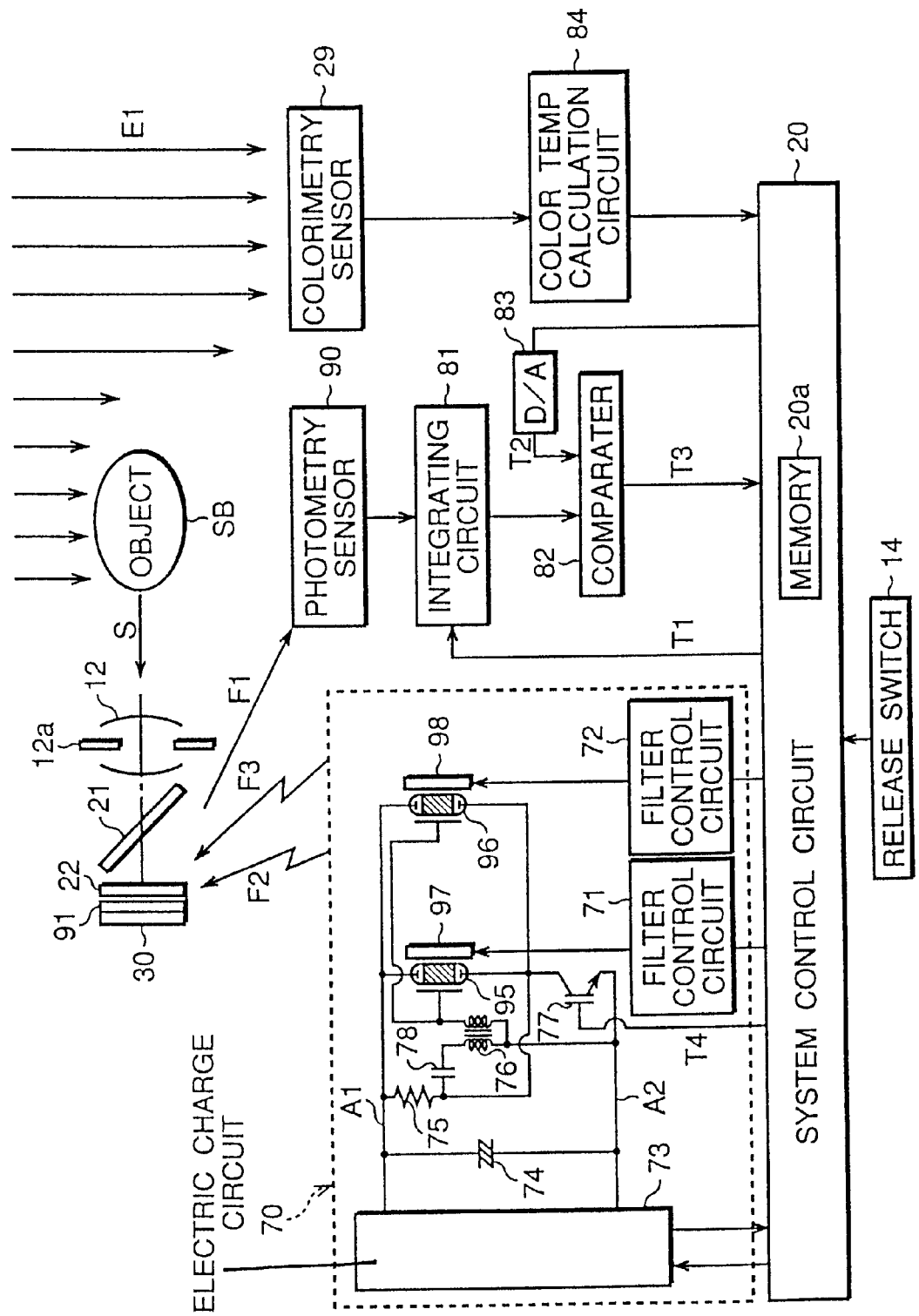
FIG. 17 is a block diagram of an electronic flash device and a circuit for controlling a radiating operation of the electronic flash device.

FIG. 17 shows an electronic flash device 70 including the first and second illumination mechanisms 93 and 94, and a circuit for controlling the radiating operation of the electronic flash device 70.

A photometry sensor 90 is composed of a photoelectric conversion element such as a photodiode, for example. The photometry sensor 90 receives a light (F1), which is radiated by the electronic flash device 70 and reflected by the electro-developing recording medium 30, and light (S) corresponding to the object image, which is formed through the photographing optical system 12, and photoelectrically converts the lights (F1) and (S), so that a luminance on the light receiving surface of the electro-developing recording medium 30 is sensed. A colorimetry sensor 29 is a so-called white balance sensor, and is composed of a plurality of photoelectric conversion elements in which the sensitivities for the visible light spectra are different from each other. An output signal of the colorimetry sensor 29 is subjected to a predetermined process in a color temperature calculation circuit 84, so that the color temperature of ambient light (E1) around an object (SB) to be photographed is obtained. This color temperature data is inputted into the system control circuit 20, so that the color temperature of the light radiated by the electronic flash device 70 is determined based on the color temperature data.

The photometry sensor 90 is connected to an integrating circuit 81, and thus, a signal photoelectrically converted by the photometry sensor 90 is integrated in accordance with an integration start signal (T1) inputted from the system control circuit 20. The integrating circuit 81 is connected to the system control circuit 20 through a comparator 82, and a D/A converter 83 is connected to the comparator 82. In the comparator 82, a value of an electric voltage (i.e., a signal T2) outputted by the D/A converter 83 is compared with an integration value outputted by the integrating circuit 81, and the result of the comparison is outputted as a quench signal (T3) to the system control circuit 20. The flash radiations of xenon lamps 95 and 96 are stopped based upon the quench signal (T3). Note that the first and second xenon lamps 95 and 96 are housed in the housings 93*b* and 94*b*.

The electronic flash device 70 is connected to the system control circuit 20. Starting and stopping of the radiations of the xenon lamps 95 and 96 of the electronic flash device 70 are controlled by the system control circuit 20. The amount of radiation of each xenon lamp 95 and 96 is controlled independently. The first xenon lamp 95 radiates a flash light having a relatively low color temperature, and an outer surface of the first xenon lamp 95 is coated with an amber-colored filter. The second xenon lamp 96 radiates a flash light having a relatively high color temperature, and the outer surface of the second xenon lamp 96 is coated with a blue-colored filter. Monochroic liquid crystal filters 97 and 98 of guest-host type are provided in front of the xenon lamps 95 and 96. The density of the filters 97 and 98 are changed in accordance with the amplitude of the voltage applied thereto, and are controlled by filter control circuits 71 and 72, which are operated based on a control signal outputted from the system control circuit 20.

A first signal line A1 extended from an electric charge circuit 73 is connected to a positive electrode of a main capacitor 74, a resistor 75, and anodes of the xenon lamps 95 and 96. A second signal line A2 extended from the electric charge circuit 73 is connected to a negative electrode of the main capacitor 74, a common terminal of a trigger transformer 76, and an emitter of an insulated gate bipolar mode transistor (IGBT) 77. An impulse voltage is applied to the main capacitor 74 by the electric charge circuit 73 through the first signal line A1, so that electric charges are accumulated in the main capacitor 74. A low-voltage coil of the trigger transformer 76 is connected to a first terminal of the resistor 75 through a trigger capacitor 78. The first terminal of the resistor 75 is connected to the cathode terminals of the xenon lamps 95 and 96.

The base of the IGBT 77 is connected to the system control circuit 20, so that the IGBT 77 is turned ON by a radiation trigger signal (T4) outputted from the system control circuit 20, and thus an electric current flows from the collector of the IGBT 77 to the emitter of the IGBT 77. As a result, the electric charges accumulated in the trigger capacitor 78 are discharged, so that an electric current flows into the low-voltage coil of the trigger transformer 76, and thus a trigger pulse is generated in the high-voltage coil thereof. This trigger pulse is applied to each of the trigger electrodes of the xenon lamps 95 and 96. As a result, the electric charges accumulated in the main capacitor 74 are discharged, and thus the xenon lamps 95 and 96 radiate the electronic flashes (F2) and (F3).

The release switch 14 provided on the camera body 11 is connected to the system control circuit 20, and various kinds of operations are carried out in accordance with the handling of the release switch 14. Data used for determining the densities of the monochroic liquid crystal filters 97 and 98 is stored in a memory 20*a* provided in the system control circuit 20.

Figure 18:
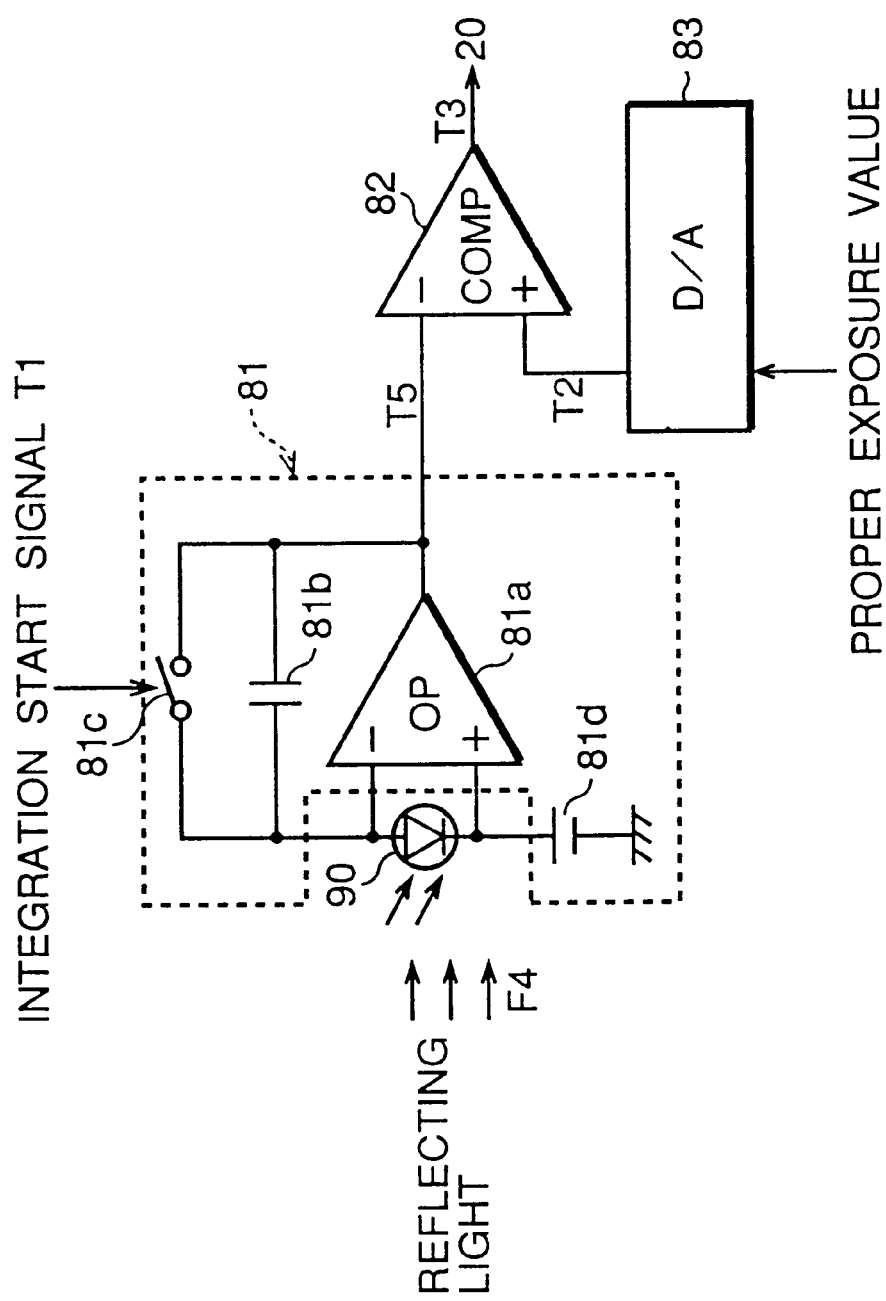
FIG. 18 is a block diagram showing connections amongst a photometry sensor, an integrating circuit, a comparator, and a D/A converter.

FIG. 18 shows a connecting condition among the photometry sensor 90, the integrating circuit 81, the comparator 82, and the D/A converter 83. The integrating circuit 81 has an operational amplifier 81*a*, an integrating capacitor 81*b*, and a reset switch 81*c*. The photometry sensor 90 has a photodiode, which is connected between the inverting input terminal and the non inverting input terminal which are provided in the operational amplifier 81*a*. A reference power supply 81*d* is connected to the non-inverting input terminal of the operational amplifier 81*a*. The reference power supply 81*d* outputs an electric voltage the value of which corresponds to the initial value when the operational amplifier 81*a* starts the integration.

The integrating capacitor 81*b* and the reset switch 81*c* are connected in parallel to each other between the non inverting input and the output terminals of the operational amplifier 81*a*, so that the reset switch 81*c* is controlled to open and close in accordance with the integration start signal (T1) inputted from the system control circuit 20. When the reset switch 81*c* is open, a photoelectric current generated in the photometry sensor 90 is integrated by the operational amplifier 81*a*. The output terminal of the operational amplifier 81*a* is connected to the inverting input terminal of the comparator 82.

The D/A converter 83 is connected to the non inverting input terminal of the comparator 82, in which the value of the voltage signal (T2) outputted by the D/A converter 83 is compared with the value of the voltage signal (T5) outputted by the operational amplifier 81*a*. When the value of the voltage signal (T5) becomes lower than the value of the voltage signal (T2), a quench signal (T3) is outputted from the comparator 82 to the system control circuit 20. Note that the value of the voltage signal (T2), i.e., a proper exposure value, is obtained by digital data inputted into the D/A converter 83 from the system control circuit 20, in which the value of the voltage signal (T2) is set in accordance with a proper exposure value setting process as described later.

Figure 20A:
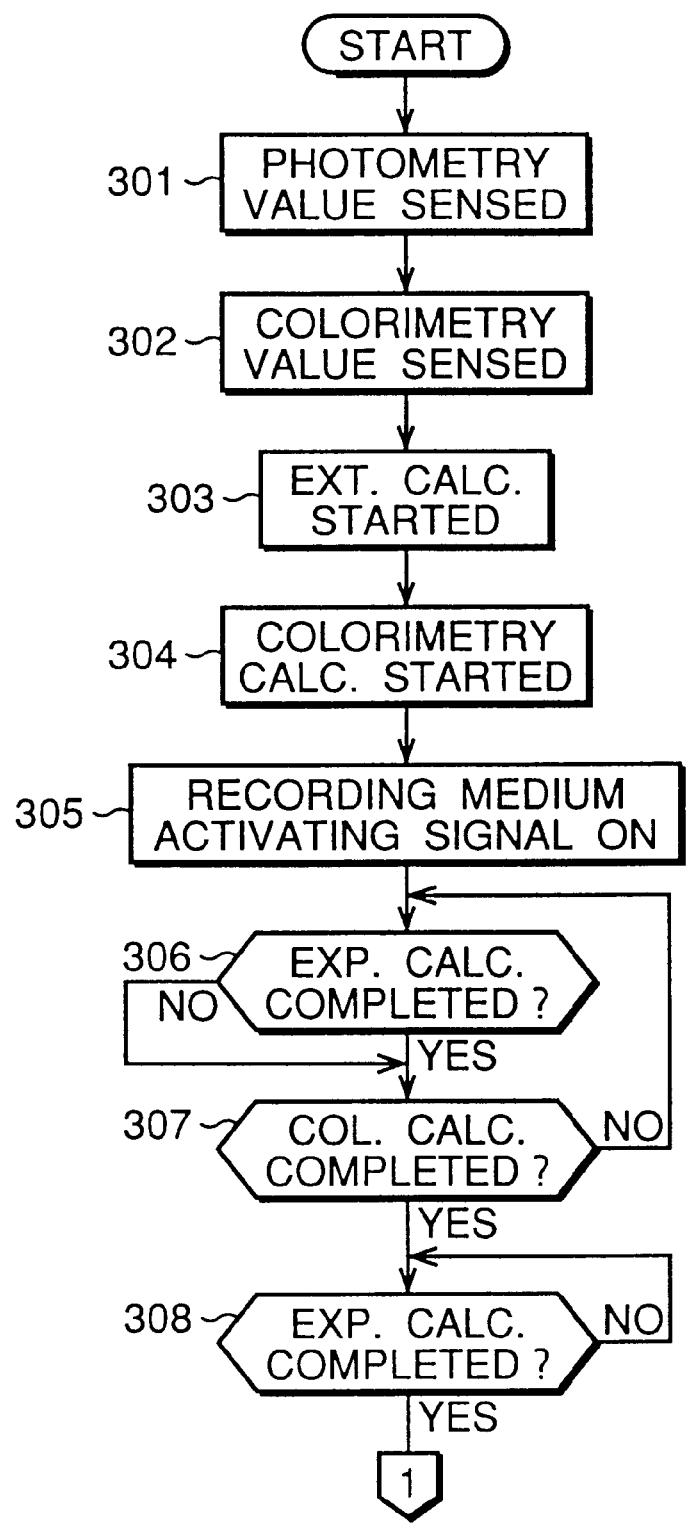
FIGS. 20A through 20C are flow charts of a program for performing the photographing operation.
Figure 20B:
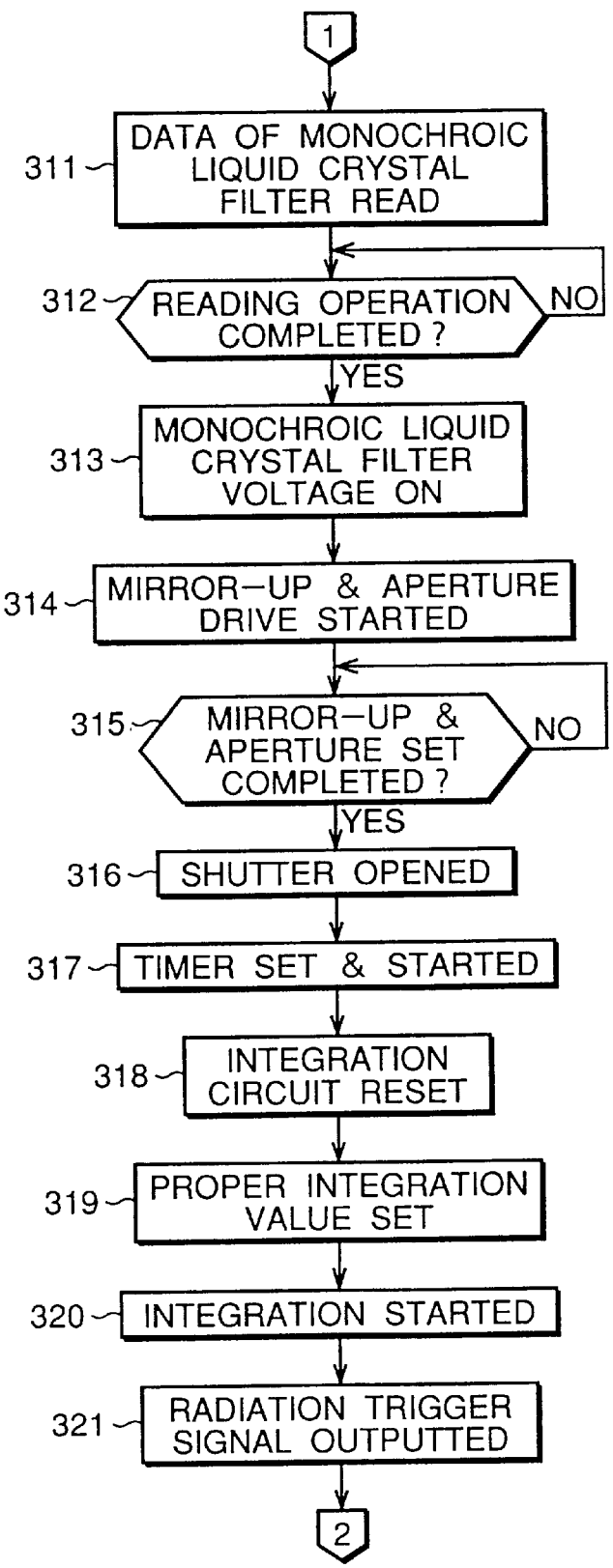
Figure 20C:
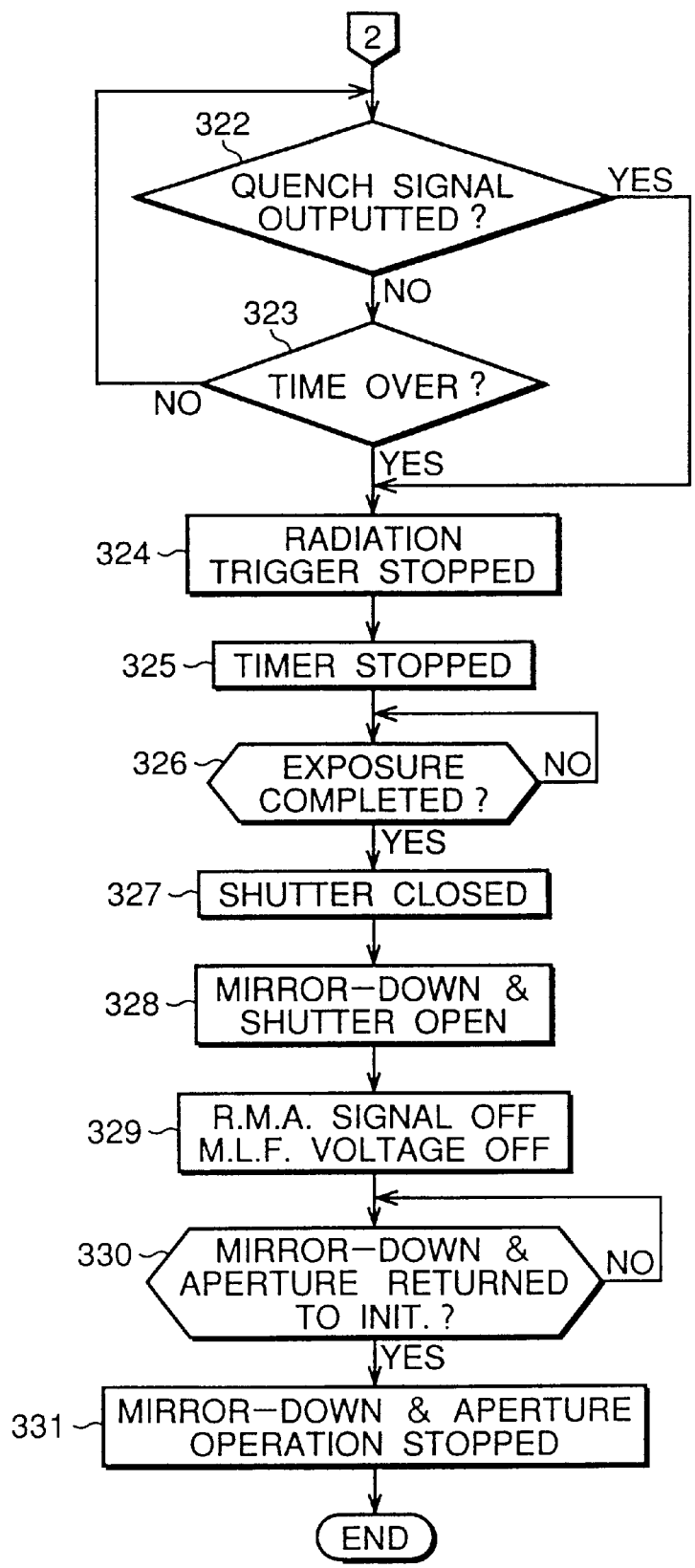

FIG. 19 is a timing chart showing a photographing operation of the second embodiment, and FIGS. 20A through 20C are flow charts of a program for performing the photographing operation. With reference to these drawings, operations of the second embodiment are described below.

This program is started when the release switch 14 is turned ON (reference S61 in FIG. 19). In Step 301, the quantity of light reflected by the object (SB) is detected based on the photometry data obtained by the photometry sensor 28, so that the photometry value is sensed. In Step 302, the colorimetry value, i.e., data corresponding to the color temperature of the ambient light around the object (SB), is sensed based on the signal outputted by the colorimetry sensor 29. In Step 303, an exposure calculation is started based on the photometry value (reference S62). In Step 304, a colorimetry calculation is started based on the colorimetry value (reference S63 in FIG. 19). In Step 305, a recording medium activating signal is outputted (reference S64 in FIG. 19), so that an electric voltage is applied to the electro-developing recording medium 30.

It is determined in Step 306 whether the exposure calculation has been completed, and it is determined in Step 307 whether the colorimetry calculation has been completed. When the colorimetry calculation has not been completed, Steps 306 and 307 are executed until the colorimetry calculation is completed. When the colorimetry calculation has been completed, the process goes from Step 307 to Step 308, in which it is determined whether the exposure calculation has been completed. Thus, the exposure calculation and the colorimetry calculation are completed, and then, the process goes to Step 311, so that the quantity of the flash light radiated on the electro-developing recording medium 30 is controlled.

In Step 311, data regarding the densities of the monochroic liquid crystal filters 97 and 98 are read from the memory 20a (reference S65 in FIG. 19). When it is confirmed in Step 312 that the reading operation of the density data has been completed, Step 313 is executed in which an electric voltage having a predetermined amount is applied to each of the monochroic liquid crystal filters 97 and 98 based on the density data (reference S66 in FIG. 19). Thus, the densities (i.e., transmittance) of the monochroic liquid crystal filters 97 and 98 are set to predetermined values in accordance with the color temperature. In Step 314, the degree of the opening of the aperture 12a is set to a value in accordance with the result of the exposure calculation (reference S67 in FIG. 19), and the quick return mirror 21 is changed from the down condition to the up condition (reference S68 in FIG. 19). When it is confirmed in Step 315 that the quick return mirror 21 has been changed to the up condition and the degree of opening of the aperture 12a has been adjusted, the shutter 22 is fully opened in Step 316 (reference S69 in FIG. 19).

In Step 317, the maximum radiation times of the xenon lamps 95 and 96 are set by timer, and the operation of the timer is started. In Step 318, the reset signal (T1) is inputted into the integrating circuit 81, and thus, the output of the integration value of the integrating circuit 81 is reset. In Step 319, in order to perform the control of adjustment of the flash light of the electronic flash device 70, the proper exposure value, which is digital data, corresponding to each of the xenon lamps 95 and 96, is outputted to the D/A converter 83, in which the proper exposure value is converted into an analog signal (T2), and outputted to the comparator 82.

In Step 320, the output of the reset signal (T1) is stopped in accordance with the fully open state of the shutter 22, and thus the resetting condition of the integrating circuit 81 is released. As a result, the photoelectric current generated in the photometry sensor 90 is integrated with time by the operational amplifier 81a. At the same time when the integration is started, the radiation trigger signal (T4) is outputted to the IGBT 77 in Step 321, so that the IGBT 77 is turned ON. As a result, the trigger voltage is applied to each of the trigger electrodes of the xenon lamps 95 and 96, and thus, flash lights are radiated by the xenon lamps 95 and 96 (reference S70 in FIG. 19).

Due to this flash light, the light (F1) reflected by the electro-developing recording medium 30 is increased. Thus, when the integration value outputted by the integrating circuit 81 reaches the value of the signal (T2), i.e., the proper exposure value, the quench signal (T3) is outputted by the comparator 82. When it is confirmed in Step 322 that the quench signal (T3) has been outputted, the output of the radiation trigger signal (T4) is stopped in Step 324, so that the IGBT 77 is turned OFF, and thus, the radiations of the xenon lamps 95 and 96 are stopped. When it is not confirmed in Step 322 that the quench signal (T3) has been outputted, it is determined in Step 323 whether the time counted by the timer has elapsed the predetermined maximum radiation time. When the predetermined time has not elapsed, the process returns to Step 322, so that the output of the quench signal (T3) is re-checked. Conversely, when a predetermined time has not elapsed, Step 324 is executed in which the output of the radiation trigger signal (T4) is compulsorily stopped. By the stopping of the output of the radiation trigger signal (T4), the IGBT 77 is turned OFF, so that the radiations of the xenon lamps 95 and 96 are stopped. Then, the timer is stopped in Step 325, and thus the radiation controls for the xenon lamps 95 and 96 are stopped (reference S71).

When the exposure period determined by the exposure calculation, which is started in Step 303, has passed and it is sensed in Step 326 that the exposure has been completed, the shutter 22 is closed in Step 322 (reference S72). By the completion of the closing operation of the shutter 22, Step 328 is executed so that the quick return mirror 21 is changed to the down condition (reference S73), and the aperture 12a is fully opened (reference S74). In Step 329, the output of the recording medium activating signal is stopped (reference S75), and the voltage applications to the monochroic liquid crystal filters 97 and 98 are stopped (reference S76).

Namely, the recording medium activating signal is outputted at least for the period while the shutter 22 is opened, and during this period, a predetermined voltage is applied to the electro-developing recording medium 30. Then, by exposing the electro-developing recording medium 30 under the voltage applied condition, the object image is developed on the electro-developing recording medium 30 as a visible object image. This visible object image is kept even if the output of the recording medium activating signal is stopped. Thus, the object image which has been subjected to the white balance adjustment is stored in the electro-developing recording medium 30.

When it is confirmed in Step 330 that the quick return mirror 21 and the aperture 12a have returned to the initial positions, the operations of the quick return mirror 21 and the aperture 12a are stopped in Step 331, and thus the program of the recording operation ends.

Figure 21:
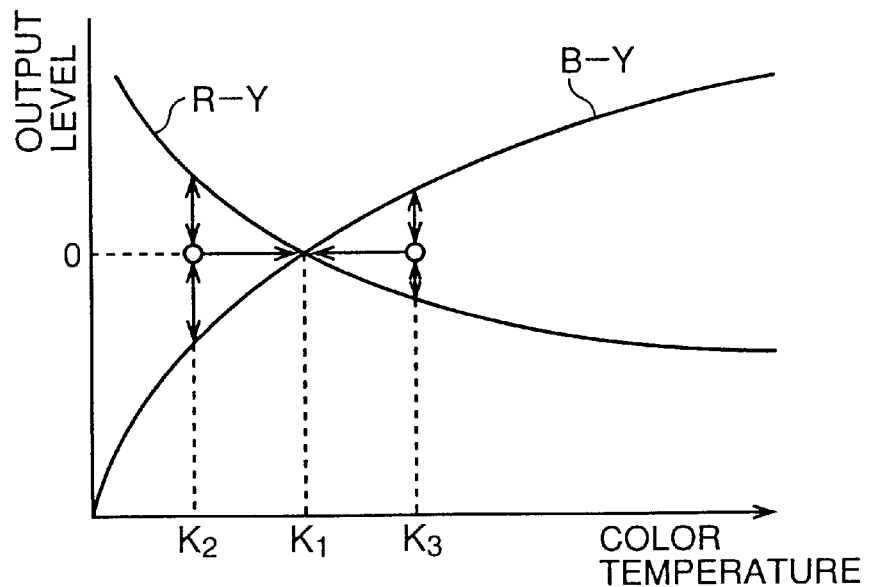
FIG. 21 is a graph showing a relationship between the color temperature of the ambient light and differential color signals of an image recorded in the electro-developing recording medium.

FIG. 21 is a graph showing a relationship between the color temperature of the ambient light (E1) and differential color signals (R-Y,B-Y) of an image recorded in the electro-developing recording medium 30. With reference to this drawing, a control of the white balance adjustment carried out by the electronic flash device 70, i.e., a control of the densities of the monochroic liquid crystal filters 97 and 98 will be described.

The higher the color temperature of the ambient light (E1), the lower the output level of the differential color signal (R-Y), and the higher the output level of the differential color signal (B-Y). The output levels of the differential color signals (R-Y) and (B-Y) become equal to each other when the color temperature of the ambient light (E1) is equal to the reference value (K1) (4700° K., for example), and in such a case, the color temperature of light radiated by the electronic flash device 70 is set to the reference value (K1).

When the color temperature (K2) of the ambient light (E1) is lower than the reference value (K1), the output level of the differential color signal (R-Y) becomes relatively high. In this case, the color temperature (K3) of light radiated by the electronic flash device 70 is set to a value higher than the reference value (K1) by a predetermined value, so that the color temperature of the light (F1) reflected by the electro-developing recording medium 30 is adjusted to the reference value (K1). To be concrete, when the ambient light (E1) is reddish, the electronic flash device 70 is controlled in such a manner that the amount of blue flash light is larger than the amount of amber flash light, so that the density of the liquid crystal filter 97 is reduced (i.e., large transmittance), and the density of the liquid crystal filter 98 is increased (i.e., small transmittance), and thus, the color tone of the image developed by the electro-developing recording medium 30 is so adjusted.

Similarly, when the color temperature (E2) of the ambient light (E1) is higher than the reference value (K1), the color temperature (K3) of light radiated by the electronic flash device 70 is set to a value lower than the reference value (K1) by a predetermined value.

The adjustments of the color temperatures of the flash lights are carried out by adjusting the densities of the liquid crystal filters 97 and 98 disposed in front of the xenon lamps 95 and 96. For this adjustment, information showing the relationship between the color temperature of the ambient light and the densities of the liquid crystal filter 97 and 98 is stored in the memory 20a of the system control circuit 20.

Namely, when the color temperature of the ambient light (E1) is obtained, the memory 20a is accessed based on the color temperature information so that the density data of the monochroic liquid crystal filters 97 and 98 is read. In the filter control circuits 71 and 72, the control voltages which are to be applied to the filters 97 and 98 are set based on the density data, and thus, the density of each of the filters 97 and 98 is controlled to a predetermined value, respectively. As a result, the amount of light passing through each of the filters 97 and 98 is controlled, and thus, the color temperature of light, which is a combination of light radiated by the xenon lamps 95 and 96, is adjusted.

As described above, the white balance adjusting device of the second embodiment is constructed in such a manner that the flash light, which is controlled in accordance with the color temperature of the ambient light, is radiated onto the electro-developing recording medium 30. Therefore, an image, which is subjected to a white balance adjustment, is developed by the electro-developing recording medium 30, and therefore, after the image is read through the line sensor 44, the white balance adjustment does not need to be performed for the image. Namely, according to the second embodiment, a circuit such as a white balance signal processing circuit, which converts the output signal of the white balance sensor to color temperature information, and carries out the white balance adjustment based on the color temperature information, does not need to be mounted in the electro-developing type camera. Thus, the electric circuit construction in the camera becomes simple.

Further, according to the second embodiment, in the photographing operation, since the electro-developing recording medium 30 is illuminated by the electronic flash device 70, it is prevented that a dark portion included in the image formed on the electro-developing recording medium 30 becomes unclear due to lack of gradation of the dark portion.

Figure 22:
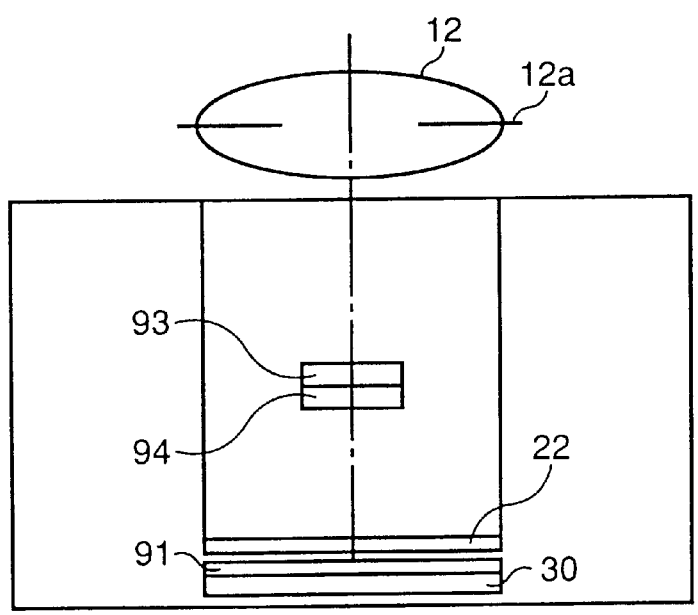
FIG. 22 is a view showing a structure, which is provided closed to a portion where the photographing optical system and the electro-developing recording medium are provided, when viewing from the view-finder optical system.
Figure 23:
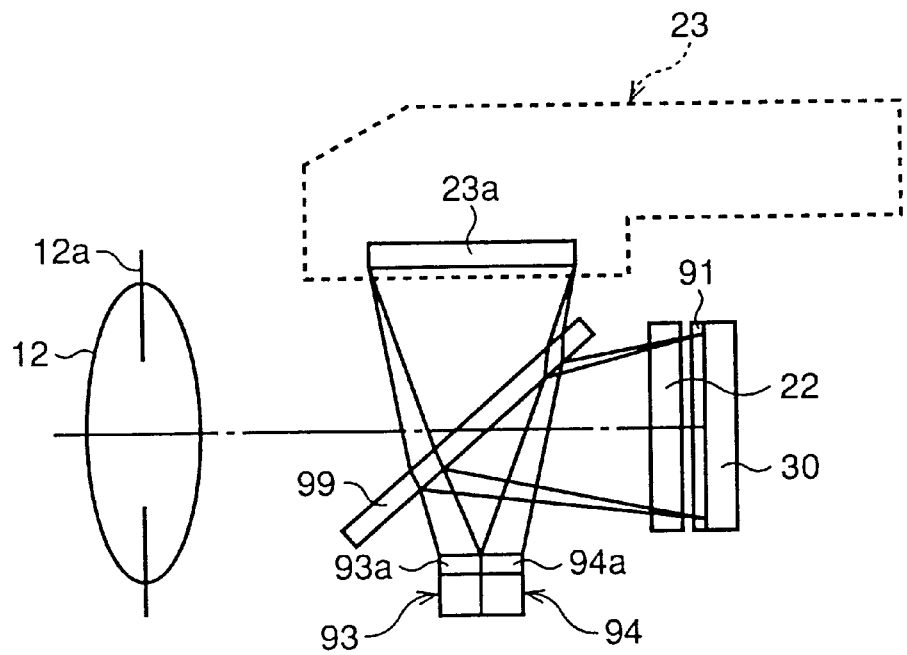
FIG. 23 is a view showing a positional relationship of the first and second illumination mechanisms and the other components.
Figure 24:
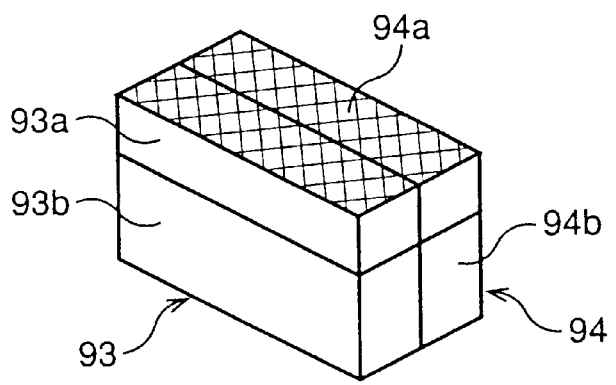
FIG. 24 is a view showing an external view of the first and second illumination mechanisms.

FIGS. 22 through 24 show a main part of a third embodiment. FIG. 22 is a view showing a structure, which is provided close to a portion where the photographing optical system 12 and the electro-developing recording medium 30 are provided, when viewing from the view-finder optical system 23 (see FIG. 2). FIG. 23 is a view showing a positional relationship of the first and second illumination mechanisms 93 and 94 and the other components. FIG. 24 is a view showing an external view of the first and second illumination mechanisms 93 and 94.

As understood from these drawings, the first and second illumination mechanisms 93 and 94 are in contact with each other, and are disposed under a pellicle mirror 99, which is a half mirror. The longitudinal direction of each of the illumination mechanisms 93 and 94 is vertical to the optical axis of the photographing optical system 12.

The pellicle mirror 99 cannot rotate, in contrast to the quick return mirror 21 which is provided in the second embodiment. A part of the light passing through the photographing optical system 12 passes through the pellicle mirror 99, and is led to the electro-developing recording medium 30. The remaining part of the light passing through the photographing optical system 12 is reflected by the pellicle mirror 99, and is led to the view-finder 23. In the photographing operation, similarly to the second embodiment, the first and second illuminating mechanisms 93 and 94 are operated, and the illumination lights reflected by the pellicle mirror 99 are led to the electro-developing recording medium 30.

The other constructions and operations of the white balance adjusting device of the third embodiment are the same as those of the second embodiment. Thus, according to the third embodiment, the same effects as in the second embodiment are obtained.

Note that the electro-developing recording medium 30 is not restricted to the construction described above, but can be any medium in which an image is developed electronically.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 8-29939 (filed on Jan. 24, 1996) and No. 8-31314 (filed on Jan. 25, 1996) which are expressly incorporated herein, by reference, in their entirety.

What is claimed is:

1. A white balance adjusting device provided in an electro-developing type camera using an electro-developing recording medium by which a color image formed thereon is electronically developed, said white balance adjusting device comprising:

a first radiating processor that radiates a light having a first color temperature onto said electro-developing recording medium;

a second radiating processor that radiates a light having a second color temperature, which is different from said first color temperature, onto said electro-developing recording medium;

a colorimetry sensor that senses a color temperature of ambient light around an object which is to be photographed by said electro-developing type camera; and a light amount control processor that controls an amount of light radiated by said first radiating processor and said second radiating processor, in accordance with said color temperature sensed by said colorimetry sensor, so that a white balance adjustment for said color image developed by said electro-developing recording medium is performed.

2. A white balance adjusting device according to claim 1, wherein said first radiating processor comprises a first lamp which can radiate an electronic flash having said first color temperature, and said second radiating processor comprises a second lamp which can radiate an electronic flash having said second color temperature.

3. A white balance adjusting device according to claim 2, wherein said first and second radiating processor comprises first and second monochromatic liquid crystal filters, which face said first and second lamps respectively and control the amount of light passing therethrough.

4. A white balance adjusting device according to claim 3, wherein said light amount control processor controls transmission densities of said first and second monochromatic liquid crystal filters.

5. A white balance adjusting device according to claim 1, wherein said first radiating processor can radiate an amber electronic flash, and said second radiating processor can radiate a blue electronic flash.

6. The white balance adjusting device provided in an electro-developing type camera according to claim 1, further comprising a diffuser provided on a radiating surface of each of the first and second radiating processors.

7. The white balance adjusting device provided in an electro-developing type camera according to claim 1, the electro-developing recording medium comprising an electrostatic information recording medium generating an electric charge in accordance with an image formed thereon, and an electric charge storage medium which generates a visible image in accordance with said electric charge and which can hold said visible image.

8. The white balance adjusting device provided in an electro-developing type camera according to claim 7, said electric charge storage medium comprising a liquid crystal display having a memory type liquid crystal.

9. The white balance adjusting device provided in an electro-developing type camera according to claim 1, said first radiating processor and said second radiating processor being positioned between a photographing optical system of the electro-developing type camera and a quick return mirror of the camera.

10. The white balance adjusting device provided in an electro-developing type camera according to claim 1, said first color temperature being lower than said second color temperature, each of said first and second radiating processors comprising a xenon lamp, a surface of said first radiating processor being coated with an amber colored filter and a surface of said second radiating processor being coated with a blue colored filter.

11. The white balance adjusting device provided in an electro-developing type camera according to claim 10, further comprising monochoric liquid crystal filters provided in front of the first and second radiating processors, a density of said monochoric liquid crystal filters being changed in accordance with an amplitude of a voltage applied to said monochoric liquid crystal filters.

* * * * *